(12) United States Patent
Zheng et al.

(10) Patent No.: US 11,675,076 B2
(45) Date of Patent: Jun. 13, 2023

(54) SOLID STATE LIGHT DETECTION AND RANGING (LIDAR) SYSTEM AND SYSTEM AND METHOD FOR IMPROVING SOLID STATE LIGHT DETECTION AND RANGING (LIDAR) RESOLUTION

(71) Applicant: SZ DJI TECHNOLOGY CO., LTD., Shenzhen (CN)

(72) Inventors: Guoguang Zheng, Shenzhen (CN); Xiaoping Hong, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 599 days.

(21) Appl. No.: 16/801,690

(22) Filed: Feb. 26, 2020

(65) Prior Publication Data

US 2020/0191959 A1  Jun. 18, 2020

Related U.S. Application Data

(63) Continuation of application No. PCT/CN2017/100069, filed on Aug. 31, 2017.

(51) Int. Cl.
*G01S 17/10* (2020.01)
*G01S 7/481* (2006.01)
*G01S 7/484* (2006.01)

(52) U.S. Cl.
CPC .............. *G01S 17/10* (2013.01); *G01S 7/484* (2013.01); *G01S 7/4816* (2013.01); *G01S 7/4817* (2013.01)

(58) Field of Classification Search
None
See application file for complete search history.

(56) References Cited

U.S. PATENT DOCUMENTS

2003/0223053 A1   12/2003   Liu et al.
2007/0064976 A1   3/2007    England, III
(Continued)

FOREIGN PATENT DOCUMENTS

CN    87210363 U     9/1988
CN    101430377 A    5/2009
(Continued)

OTHER PUBLICATIONS

International Search Report from the State Intellectual Property Office of the P.R. China for International Application No. PCT/CN2017/100036, dated May 25, 2018 (5 pages).
(Continued)

*Primary Examiner* — Eileen M Adams
(74) *Attorney, Agent, or Firm* — Xsensus LLP

(57) ABSTRACT

A sensor system can comprise a detector with a plurality of units, wherein the detector is configured to generate a first set of electrical signals based on received photon energy of a light beam that is reflected back from a first plurality of points on one or more objects, in a first configuration. Additionally, the detector is configured to generate a second set of electrical signals based on received photon energy of a light beam that is reflected back from a second plurality of points on one or more objects in a second configuration, wherein the first configuration and the second configuration are with a predetermined correlation. Furthermore, the detector can determine distance to each of the first plurality of points and the second plurality of points on the one or more objects based on the first set of electrical signals and the second set of electrical signals.

17 Claims, 17 Drawing Sheets

(56) References Cited

U.S. PATENT DOCUMENTS

| | | |
|---|---|---|
| 2007/0182949 A1 | 8/2007 | Niclass |
| 2008/0013170 A1 | 1/2008 | Tanaka |
| 2008/0316561 A1* | 12/2008 | Okugawa ............. G02B 26/105 |
| | | 359/201.1 |
| 2009/0262415 A1 | 10/2009 | Cottingame et al. |
| 2011/0169117 A1 | 7/2011 | McIntosh et al. |
| 2011/0228249 A1 | 9/2011 | Koehler et al. |
| 2012/0038903 A1 | 2/2012 | Weimer et al. |
| 2012/0050715 A1 | 3/2012 | Krainak |
| 2013/0083887 A1 | 4/2013 | Li et al. |
| 2013/0087684 A1 | 4/2013 | Guetta et al. |
| 2013/0128257 A1 | 5/2013 | Stettner et al. |
| 2013/0208256 A1 | 8/2013 | Mamidipudi et al. |
| 2014/0225276 A1 | 8/2014 | Ho et al. |
| 2015/0185313 A1 | 7/2015 | Zhu |
| 2015/0293226 A1 | 10/2015 | Eisele et al. |
| 2015/0356747 A1 | 12/2015 | Dielacher et al. |
| 2016/0097843 A1 | 4/2016 | Nakamura |
| 2016/0210727 A1* | 7/2016 | Yang ....................... G06T 5/003 |
| 2017/0131388 A1 | 5/2017 | Campbell et al. |
| 2017/0153319 A1 | 6/2017 | Villeneuve et al. |
| 2017/0242103 A1 | 8/2017 | Dussan |
| 2017/0242106 A1 | 8/2017 | Dussan et al. |
| 2017/0285148 A1 | 10/2017 | Hipp |
| 2018/0246029 A1* | 8/2018 | Wu ........................... G01J 3/513 |
| 2018/0267152 A1* | 9/2018 | McMichael ............. G01S 17/14 |
| 2018/0284228 A1 | 10/2018 | LaChapelle |
| 2021/0080575 A1* | 3/2021 | Nehmadi ............. G06V 10/141 |
| 2021/0231803 A1* | 7/2021 | Smits ................... G01S 7/4808 |

FOREIGN PATENT DOCUMENTS

| | | |
|---|---|---|
| CN | 102150037 A | 8/2011 |
| CN | 102280456 A | 12/2011 |
| CN | 102438111 A | 5/2012 |
| CN | 102549380 A | 7/2012 |
| CN | 102866433 A | 1/2013 |
| CN | 103502841 A | 1/2014 |
| CN | 103645470 A | 3/2014 |
| CN | 103745969 A | 4/2014 |
| CN | 103839951 A | 6/2014 |
| CN | 104049255 A | 9/2014 |
| CN | 104122561 A | 10/2014 |
| CN | 104160295 A | 11/2014 |
| CN | 104505394 A | 4/2015 |
| CN | 204649963 U | 9/2015 |
| CN | 105895645 A | 8/2016 |
| CN | 105988266 A | 10/2016 |
| CN | 105990165 A | 10/2016 |
| CN | 205643711 U | 10/2016 |
| CN | 106165399 A | 11/2016 |
| CN | 106526573 A | 3/2017 |
| CN | 106970393 A | 7/2017 |
| CN | 107024696 A | 8/2017 |
| CN | 107076853 A | 8/2017 |
| CN | 108139483 A | 6/2018 |
| EP | 2211202 A1 | 7/2010 |
| EP | 3141961 A2 | 3/2017 |
| EP | 3 159 711 A1 | 4/2017 |
| GB | 2 449 752 A | 12/2008 |
| JP | H 9-186920 A | 7/1997 |
| JP | 2004-523769 A | 8/2004 |
| JP | 2007-192835 A | 8/2007 |
| JP | 2008-021890 A | 1/2008 |
| JP | 2009-531655 A | 9/2009 |
| JP | 2012-513694 A | 6/2012 |
| JP | 2012-207929 A | 10/2012 |
| JP | 2013-016963 A | 1/2013 |
| JP | 2014-517921 A | 7/2014 |
| JP | 2015-007615 A | 1/2015 |
| JP | 2016-075564 A | 5/2016 |
| JP | 2016-178341 A | 10/2016 |
| JP | 2016-537613 A | 12/2016 |
| JP | 2017-015611 A | 1/2017 |
| JP | 2017-032355 A | 2/2017 |
| JP | 2017-033962 A | 2/2017 |
| JP | 2017-054123 A | 3/2017 |
| KR | 10-2013-0042552 A | 4/2013 |
| KR | 10-2015-0089673 A | 8/2015 |
| WO | WO 2008/113067 A2 | 9/2008 |
| WO | WO 2012/144340 A1 | 10/2012 |
| WO | WO 2016/153687 A1 | 9/2016 |
| WO | WO 2016/199850 A1 | 12/2016 |
| WO | WO 2017/022152 A1 | 2/2017 |
| WO | WO 2017/09181 A1 | 6/2017 |
| WO | WO 2017/104486 A1 | 6/2017 |

OTHER PUBLICATIONS

International Search Report from the State Intellectual Property Office of the P.R. China for International Application No. PCT/CN2017/100039, dated May 28, 2018 (4 pages).

International Search Report from the State Intellectual Property Office of the P.R. China for International Application No. PCT/CN2017/100069, dated May 29, 2018 (5 pages).

International Search Report from the State Intellectual Property Office of the P.R. China for International Application No. PCT/CN2017/099998, dated Jun. 7, 2018 (9 pages).

International Search Report from the State Intellectual Property Office of the P.R. China for International Application No. PCT/CN2017/099989, dated May 28, 2018 (5 pages).

Summons to attend oral proceedings pursuant to Rule 115(1) EPC issued May 11, 2022, in corresponding European Patent Application 17 923 425.7.

Decision to Grant dated May 17, 2022, in corresponding Japanese Patent Application 2020-504345.

Nobuki Kotake et al., "Performance Improvement of Real-Time 3D Imaging Ladar Based on a Modified Array Receiver," Laser Radar Technology and Applications XVII, SPIE, 1000 20$^{th}$ St. Bellingham WA 98225-6705 USA, vol. 8379, No. 1, May 11, 2012, pp. 1-7, XP060003291 (7 pages).

Sun Pengfei et al., "A Flexible Ultrathin-Body Single-Photon Avalanche Diode With Dual-Side Illumination", IEEE Journal of Selected Topics in Quantum Electronics, IEEE Service Center, Piscataway, NJ, US, vol. 20, No. 6, Nov. 1, 2014, pp. 1-8 XP01157850 (8 pages).

* cited by examiner

SOLID STATE LIGHT DETECTION AND RANGING (LIDAR) SYSTEM AND SYSTEM AND METHOD FOR IMPROVING SOLID STATE LIGHT DETECTION AND RANGING (LIDAR) RESOLUTION

CROSS-REFERENCE TO RELATED PATENT APPLICATIONS

This application is a continuation of International Application No. PCT/CN2017/100069, filed Aug. 31, 2017, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to sensing, and more particularly, but not exclusively, to optical sensing.

BACKGROUND

Sensors are important for performing various types of operations, e.g. by movable or stationary objects. Especially, movable objects, such as robots, manned vehicles and unmanned vehicles, can take advantage of different sensors for sensing the surrounding environment. For example, movable objects need to be aware of surrounding condition in order for performing path planning, obstacle detection and avoidance in an unknown environment. This is the general area that embodiments of the invention are intended to address.

SUMMARY

Described herein are systems and methods that provide a technical solution for performing optical detection and ranging. A sensor system can comprise a light source configured to emit a light beam. Furthermore, the sensor system comprises one or more optical elements that is configured to homogenize the emitted light beam, which is directed toward a field of view (FOV) of the sensor system. Additionally, the sensor system comprises a detector with a plurality of photo detection devices, wherein each photo detection device of the plurality of photo detection devices is configured to receive at least a portion of photon energy of the light beam that is reflected back from one or more objects in the FOV of the sensor system and generate at least one electrical signal based on the received photon energy.

Also described herein are systems and methods that provide a technical solution for performing optical detection and ranging. A sensor system can comprise a detector with a plurality of units, wherein the detector is configured to generate a first set of electrical signals based on received photon energy of a light beam that is reflected back from a first plurality of points on one or more objects, in a first configuration. Additionally, the detector is configured to generate a second set of electrical signals based on received photon energy of a light beam that is reflected back from a second plurality of points on one or more objects in a second configuration, wherein the first configuration and the second configuration are with a predetermined correlation. Furthermore, the detector can determine distance to each of the first plurality of points and the second plurality of points on the one or more objects based on the first set of electrical signals and the second set of electrical signals.

DETAILED DESCRIPTION

The invention is illustrated, by way of example and not by way of limitation, in the figures of the accompanying drawings in which like references indicate similar elements.

It should be noted that references to "an" or "one" or "some" embodiment(s) in this disclosure are not necessarily to the same embodiment, and such references mean at least one.

The description of the invention as following uses a light detection and ranging (LIDAR) sensor system as example for an optical sensing system. It will be apparent to those skilled in the art that other types of optical sensing systems can be used without limitation.

In accordance with various embodiments, a technical solution can be provided for performing optical detection and ranging. A sensor system can comprise a light source configured to emit a light beam. Furthermore, the sensor system comprises one or more optical elements that is configured to homogenize the emitted light beam, which is directed toward a field of view (FOV) of the sensor system. Additionally, the sensor system comprises a detector with a plurality of photo detection devices, wherein each photo detection device of the plurality of photo detection devices is configured to receive at least a portion of photon energy of the light beam that is reflected back from one or more objects in the FOV of the sensor system and generate at least one electrical signal based on the received photon energy.

In accordance with various embodiments, a technical solution can be provided for performing optical detection and ranging. A sensor system can comprise a detector with a plurality of units, wherein the detector is configured to generate a first set of electrical signals based on received photon energy of a light beam that is reflected back from a first plurality of points on one or more objects, in a first configuration. Additionally, the detector is configured to generate a second set of electrical signals based on received photon energy of a light beam that is reflected back from a second plurality of points on one or more objects in a second configuration, wherein the first configuration and the second configuration are with a predetermined correlation. Furthermore, the detector can determine distance to each of the first plurality of points and the second plurality of points on the one or more objects based on the first set of electrical signals and the second set of electrical signals.

Figure 1:
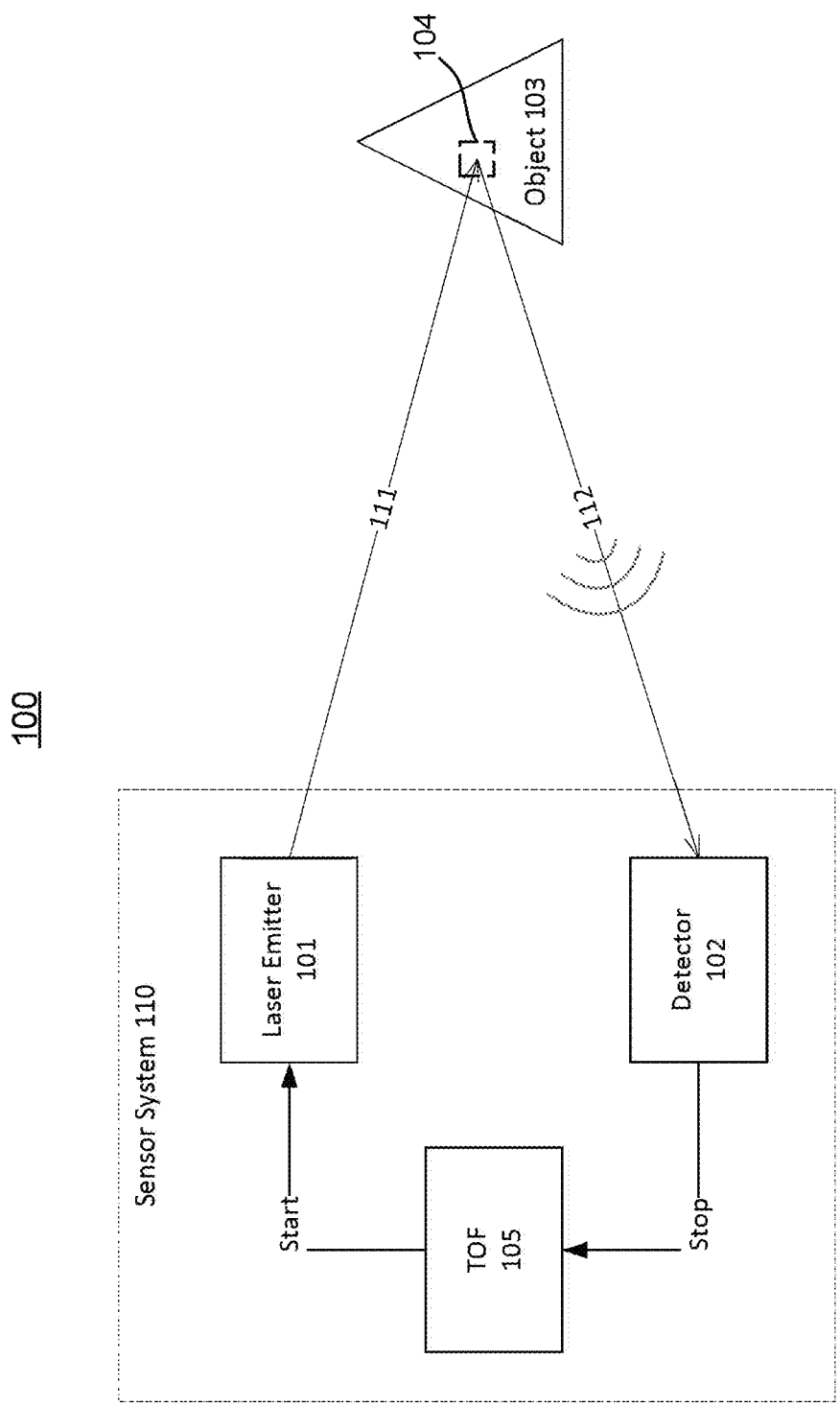
FIG. 1 shows a schematic diagram of an exemplary light detection and ranging (LIDAR) sensing system, in accordance with various embodiments of the present invention.

FIG. 1 shows a schematic diagram 100 of an exemplary LIDAR sensing system, in accordance with various embodiments of the present invention. As shown in FIG. 1, a sensor system 110 can be used for scanning the surrounding environment and detecting the distance between the sensor system 110 and one or more objects (e.g. an object 103) within a field of view (FOV) of the sensor system 110.

The sensor system 110 can include a light source, e.g. a laser emitter 101 such as a light emitting diode (LED), which can generate a light beam such as a laser beam. For example, the laser beam can be a single laser pulse or a series of laser pulses. In accordance with various embodiments, the light beam can be used to scan the surrounding environment in the FOV of the sensor system 110. For example, the light beam may reach the object 103 and can be reflected back toward the sensor system 110 from a point (or a portion) 104 on the surface of the object 103. Furthermore, the sensor system 110, e.g. a LIDAR sensor system, can measure the time for light to travel between the sensor system 110 and the point 104, i.e. the time-of-flight (TOF), in order to detect the distance information of the object 103.

Additionally, there exist multiple types of conventional LIDAR. In addition to the aforementioned time-of-flight (TOF) LIDAR, there exists frequency modulated continuous wave (FMCW) LIDAR. TOF LIDAR measures a time for transmitted and received laser pulses, and is therefore typically found in long range implementation. FMCW LIDAR systems may be prevalent in shorter range applications, where superior imaging is required. In a FMCW LIDAR system, the frequency of laser beam coming out of the emitter changes over time. Based on the frequency-time relationship in the emitted laser beam, the round-trip travel time may be calculated from the difference in frequency between emitted laser beam and as-received reflected laser beam, and consequently the distance to the target object can be calculated.

In accordance with various embodiments of the present invention, a detector 102 can receive at least a portion of the reflected light and can convert the received photo energy into electrical signals. For example, the detector 105 can take advantage of one or more photo devices, such as one or more avalanche photodiode (APD) devices, which are highly sensitive semiconductor electronic devices. The APD devices can convert the received photo energy into electricity by exploiting the photocurrent effect.

In accordance with various embodiments of the present invention, a measuring circuitry, such as a time-of-flight (TOF) unit 105, can be used for measuring the TOF in order to detect the distance to the object 103. For example, the TOF unit 105 can compute the distance based on the formula t=2D/c, where D is the distance between the sensor system 110 and the object 103, c is the speed of light, and t is the time that takes for light to take the round trip from the sensor system 110 to the object 103 and back to the sensor system 110. Thus, the sensor system 110 can measure the distance to the object 103 based on the elapsed time (or time difference) between the emitting of the light pulse 111 by the light source 101 and the receiving of the return beam 112 by the detector 105.

In various embodiments, the laser emitter 101 can emit light at the nanosecond (ns) level. For example, the light emitter 101 may generate a laser pulse with a duration close to 10 ns, and the detector 105 can detect the return signal for a similar duration. Furthermore, the reception process can determine the pulse receiving time, e.g. by detecting the rising edge of a measured electrical pulse. Also, the detection may take advantage of a multi-stage amplification process. Thus, the sensor system 110 can use the pulse emission time information and the pulse receiving time information for calculating the time-of-flight (TOF) information in order to determine the distance information.

Figure 2:
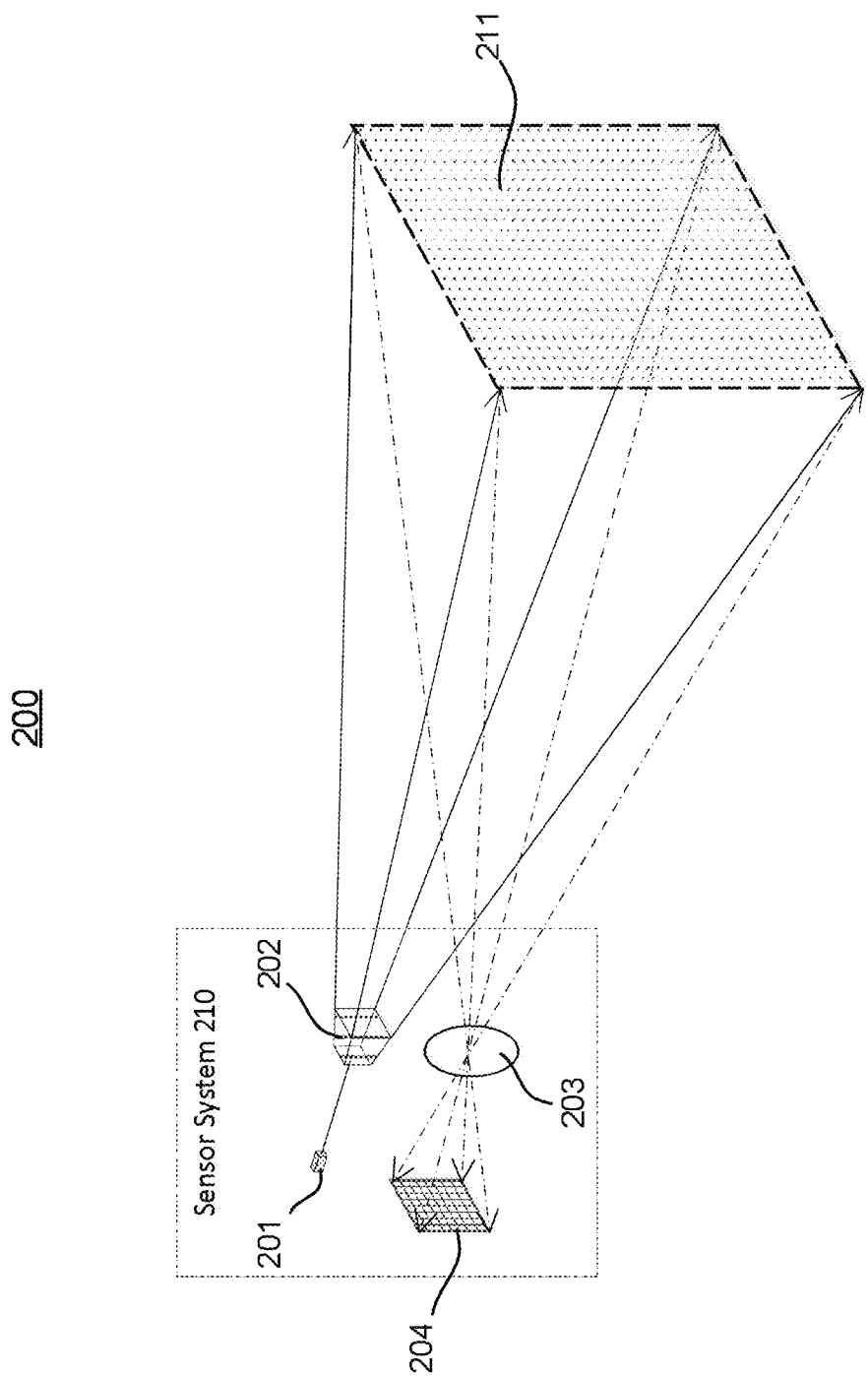
FIG. 2 shows a schematic diagram of an exemplary solid-state LIDAR sensor system, in accordance with various embodiments of the present invention.

FIG. 2 shows a schematic diagram 200 of an exemplary solid-state LIDAR sensor system, in accordance with various embodiments of the present invention. As shown in FIG. 2, the LIDAR sensor system 210 can comprise a light source 201, e.g. a laser emitter, which can emit a light beam such as a laser beam. For example, the laser emitter can generate either a single laser pulse or a series of laser pulses.

In accordance with various embodiments, the light source 201 can take advantage of one or more laser diodes. For example, the light source 201 can comprise a single laser diode, such as a high-power LED. Alternatively, the light source 201 can comprise a multi-die package of laser diodes (e.g. in a chip) to improve the uniformity of light.

In accordance with various embodiments, the light source 201 can take advantage of a surface emitting device. For example, the light source 201 can comprise a vertical cavity surface emitting laser (VCSEL) device. The VCSEL laser can be beneficial in improving the uniformity of light, since the VCSEL laser is a surface emission laser, which is easier to form a laser array at wafer level than conventional edge emission lasers. Also, the VCSEL laser can be more stable in performance. For example, the VCSEL laser can be less sensitive to temperature change (e.g., the wavelength temperature coefficient for the VCSEL laser may be ⅕ or less of the general laser wavelength temperature coefficient).

Furthermore, the light beam emitted by the light emitter can have a wavelength that is optimized for ranging and sensing applications. For example, the wavelength of the light beam can be configured to avoid the wavelength of strong sun lights, in order to reduce noise. In one example, the wavelength of the light beam may be configured to be about 905 nm. In another example, the wavelength of the light beam may be configured to be about 1550 nm.

In accordance with various embodiments, a LIDAR sensor system 210 can employ one or more optical elements 202 to expand the light beam emitted from the light source 201, in order to achieve a large field of view (FOV) 211 for the LIDAR sensor system 210. As shown in FIG. 2, the expanded light can be directed to the FOV 211 of the sensor system 210, in which one or more objects may exist. Subsequently, the light may be reflected back from the one or more objects in the FOV 211 toward the sensor system 210. Additionally, the LIDAR sensor system 201 can employ one or more optical elements, e.g. a lens 203, to capture, direct and improve the reception of the photo energy.

In accordance with various embodiments, the reflected light can be received by a receiving device, such as a detector 204. As shown in FIG. 2, the detector 204 can comprise a plurality of photovoltaic devices (or units), such as an array of avalanche photodiode (APD) devices, which are highly sensitive semiconductor electronic devices. In various embodiments, the array of APD device can be aligned one-dimensionally or multi-dimensionally (e.g. in a two-dimensional matrix form). Also, each individual APD device in the array can separately convert the received photo energy to electricity by exploiting the photocurrent effect.

Thus, the sensor system 210, e.g. a LIDAR sensor system, can detect the distance information for various surface points on the one or more objects in the FOV 211 of the sensor system 210, based on measuring the time-of-flight (TOF), i.e. the time for light to travel between the sensor system 110 and each surface point.

In accordance with various embodiments, the sensor system, which may be used in a solid-state laser radar, can take advantage of a laser with higher power and better efficiency. For example, expanding the laser beam is beneficial in improving safety, especially when a high powered laser is used, since the intensity of the expanded light beam may be substantially reduced from the original emitting intensity due to the expansion. Unlike the conventional mechanical scanning laser, the laser intensity in the sensor system (e.g. in a solid-state laser radar) may be reduced after the laser is expanded for achieving a large FOV. Thus, the power for the laser source in the sensor system, e.g. for using in a solid-state laser radar, can be much higher than the power for the laser source used in the conventional mechanical scanning laser radar. For the purpose of comparison, the conventional mechanical scanning laser system tends to make the laser energy more concentrated, since the conventional mechanical scanning laser are often configured to have a smaller angle emission (i.e. with a smaller FOV). Thus, the laser emission power for the mechanical scanning laser has to be limited in order to comply with various safety standards, in order to ensure that the laser intensity is below the safety regulations.

Figure 3:
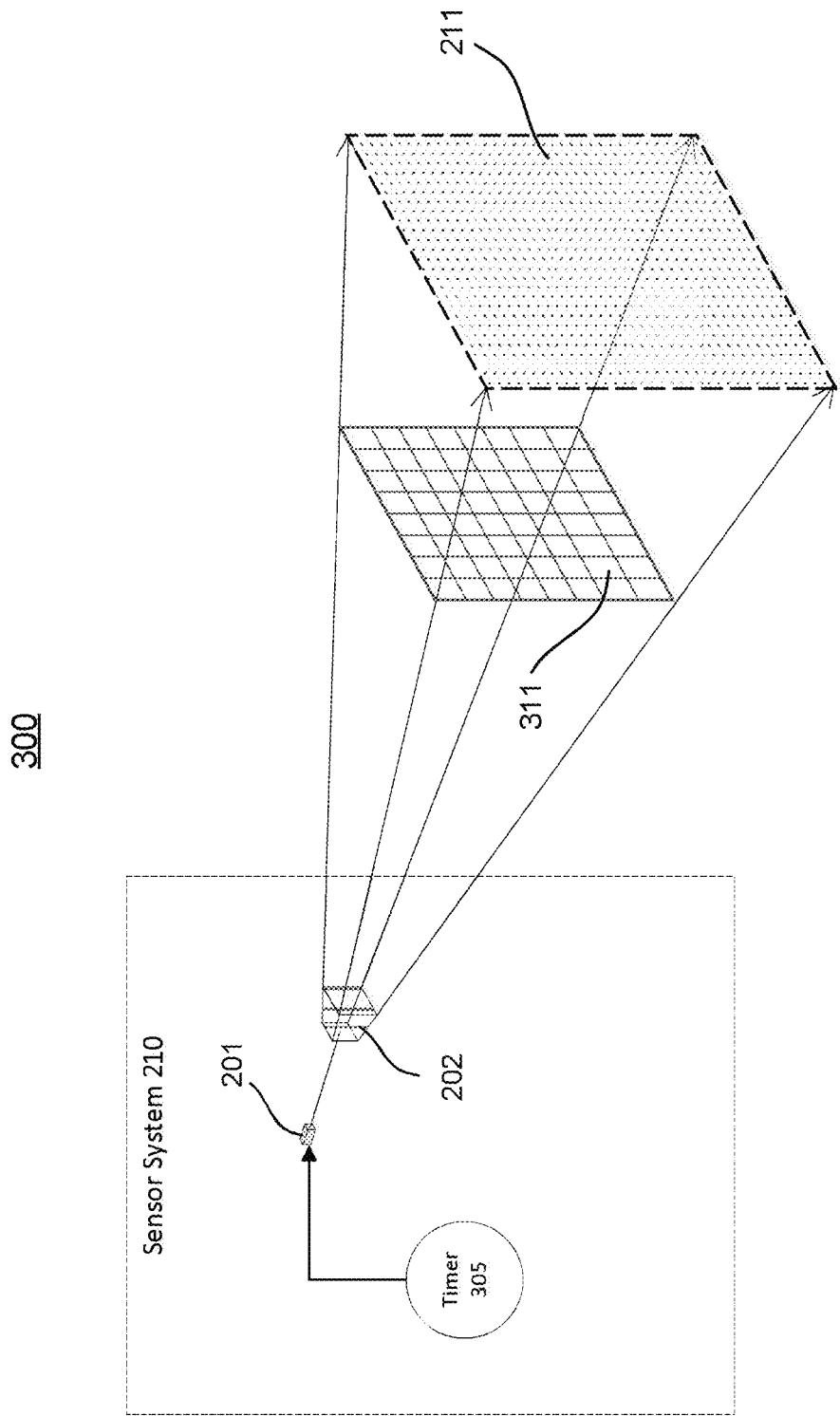
FIG. 3 shows an exemplary illustration of field of view (FOV) illumination, in accordance with various embodiments of the present invention.

FIG. 3 shows an exemplary illustration 300 of field of view (FOV) illumination, in accordance with various embodiments of the present invention. As shown in FIG. 3, a timer 305 in a sensor system 210 can trigger the light source 201 to emit a laser beam, which is directed toward a FOV 211 in the surrounding environment. For example, the timer 305 can be part of, or associated with, a controller (not shown) for the sensor system 210.

In accordance with various embodiments, the sensor system 210 can take advantage of an optical process, such as a laser beam expansion process (e.g. with a laser expander 202), to obtain a uniform (or evenly distributed) light field with a large FOV 211. For example, the laser beam expansion can be based on reflection and/or transmission of the emitted light beam. Furthermore, the beam expansion system can be implemented in a single stage or multiple stages. Alternatively, the sensor system 210 can use one or more mirrors, such as one or more two-dimensional micro-electro-mechanical systems (MEMS) micro-mirrors, which are angle adjustable, to reflect the emitted laser beam into the surrounding environment to achieve a large FOV. For example, by adjusting the angle between the MEMS micro-mirror(s) and the laser beam, the angle of the reflected laser light may change over time, and may diverge into a large two-dimensional angle. Additionally, a holographic filter can be used to generate a large-angle laser beam composed of a number of small laser beams. Additionally, laser diode arrays can be used to generate multiple light beams directly without a need to use the laser beam expansion process.

In accordance with various embodiments, the light can be directed toward a beam steering device (not shown), which can induce a deviation of the incident light. The beam steering device can steer the laser light to scan the environment surrounding the sensor system 110. For example, the beam steering device can comprises various optical elements such as prisms, mirrors, gratings, optical phased array (e.g. liquid crystal controlled grating), or any combination thereof. Also, each of these different optical elements can rotate about an axis that is substantially common (hereafter referred as a common axis without undue limitation), in order to steer the light toward different directions. I.e., the angle between rotation axes for different optical elements can be the same or slightly different. For example, the angle between rotation axes for different optical elements can be within a range of 0.01 degree, 0.1 degree, 1 degree, 2 degree, 5 degree or more.

Figure 4:
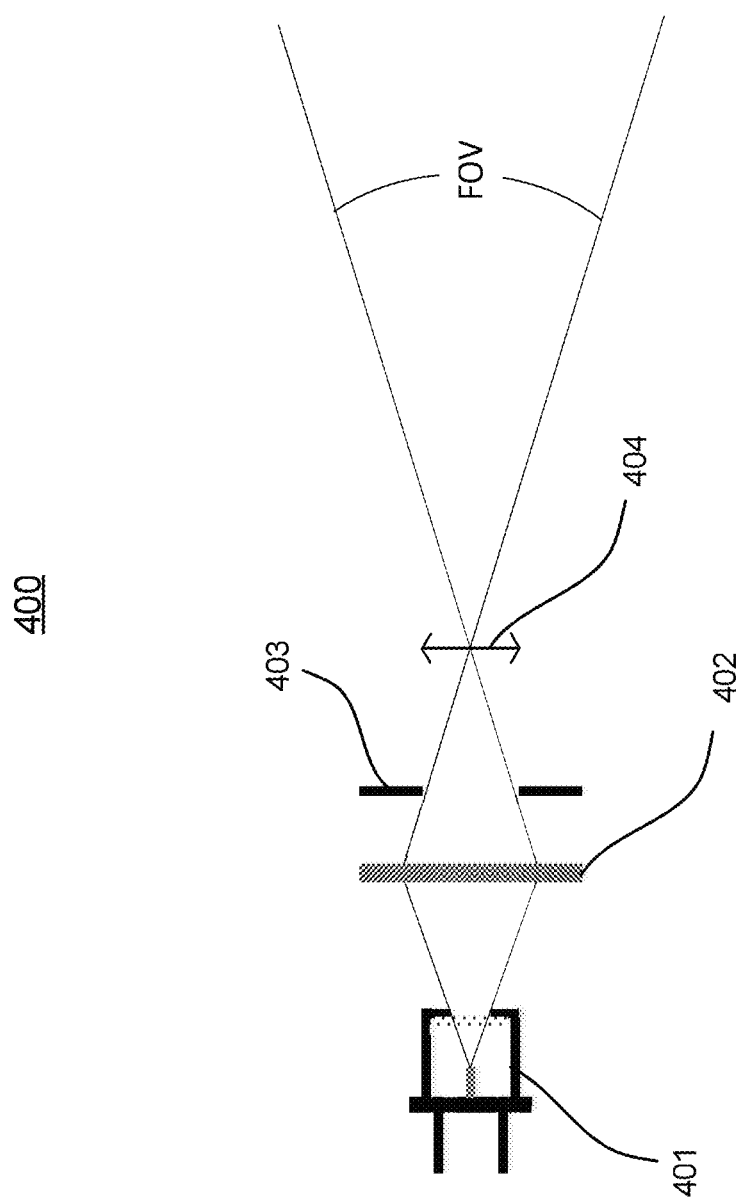
FIG. 4 show illustration of an exemplary FOV illumination scheme, in accordance with various embodiments of the present invention.

FIG. 4 show illustration of an exemplary FOV illumination scheme, in accordance with various embodiments of the present invention. As shown in FIG. 4, a light source 401 can emit a light beam toward a homogenizer 402, such as an optical diffusor, in a sensor system 400. The light beam may be collimated or not collimated. For example, the homogenizer 402 can be a diffractive optical element that can diffuse or homogenize a collimated light beam. The diffractive optical element can transform a single or multi-mode laser beam into a well-defined output beam with desired shape and intensity profile.

In accordance with various embodiments of the present invention, a convex lens 404 can be arranged along the optical axis (i.e. coaxially arranged) to configure the FOV for the sensor system 400. For example, the convex lens can be arranged at a position along the optical axis so that the homogenizer 402 is positioned at the front focal plane of the convex lens 404. Furthermore, the sensor system can use an aperture 403 to obtain a portion of outgoing light that is well-homogenized. Thus, the output beam size, which correlates to the field of view (FOV) of the sensor system, can be determined based on the aperture size, the diffusion angle of the homogenizer 402 and the focal length of the convex lens 404. Alternatively, a concave lens can be used to configure the field of view for the sensor system 400.

Figure 5:
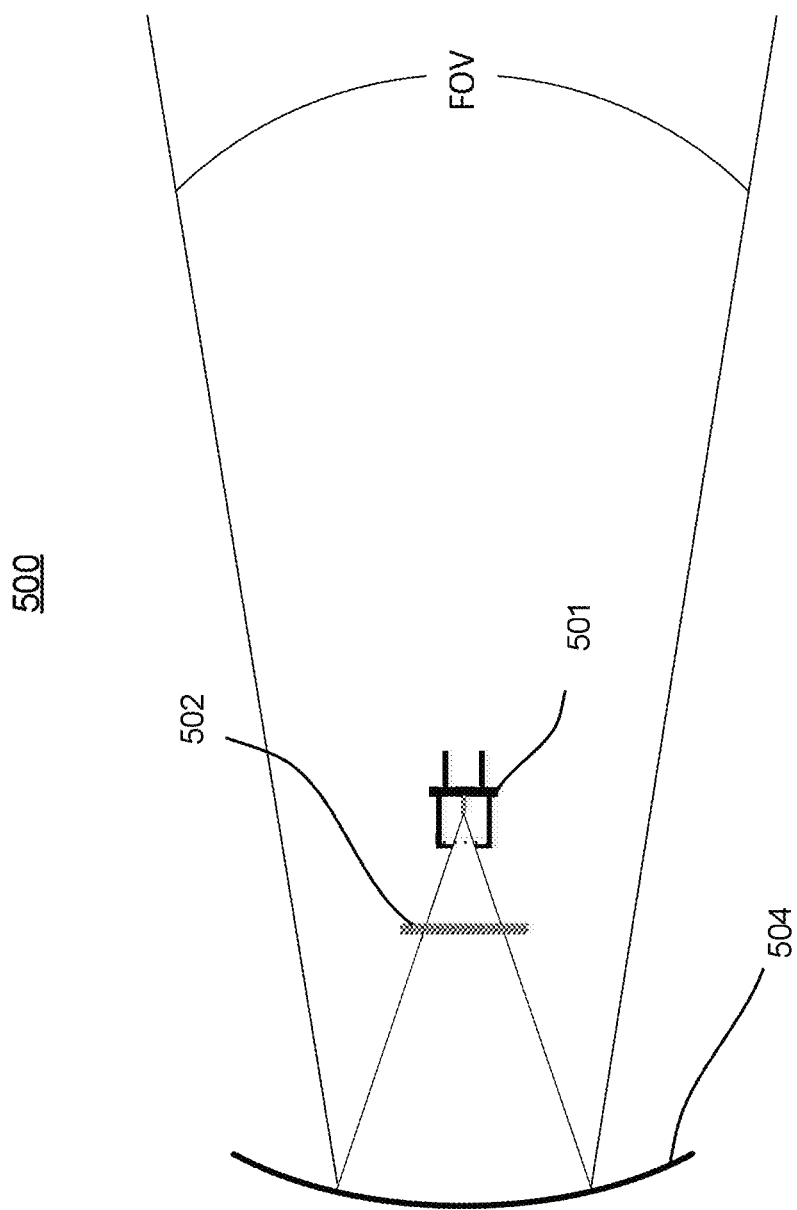
FIG. 5 show illustration of an alternative exemplary FOV illumination scheme, in accordance with various embodiments of the present invention.

FIG. 5 show illustration of an alternative exemplary FOV illumination scheme, in accordance with various embodiments of the present invention. As shown in FIG. 5, a light source 501 can emit a light beam toward a homogenizer 502, such as an optical diffusor, in a sensor system 500. The light beam, e.g. a laser beam, may be collimated or not collimated. For example, the homogenizer 502 can be a diffractive optical element that can diffuse or homogenize the light beam. For example, the diffractive optical element can transform a single or multi-mode laser beam into a well-defined output beam with desired shape and intensity profile.

In accordance with various embodiments of the present invention, a mirror 504 (either a spherical, an elliptical, or a parabolic mirror) can be used for configuring the FOV of the sensor system 500. For example, the light source 501 and the homogenizer 502 may be arranged in front of the mirror to achieve a mirror reflection that expands the light beam, which in turn can be further expanded or be manipulated using other optical processes.

Furthermore, the sensor system 500 can use an aperture (not shown) to obtain a well-homogenized outgoing light. Additionally, the homogenizer 502 can be arranged behind the light source and can be used to diffract or homogenize the reflected light off the mirror 504.

Figure 6:
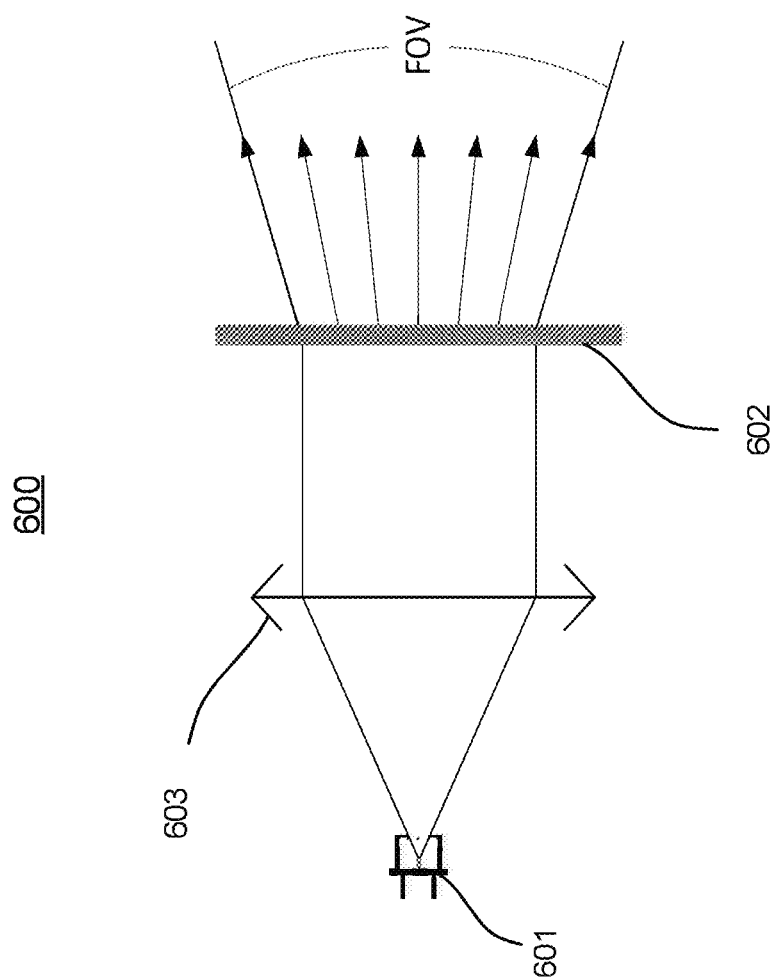
FIG. 6 show illustration of using a holographic filter for FOV illumination, in accordance with various embodiments of the present invention.

FIG. 6 show illustration of using a holographic filter for FOV illumination, in accordance with various embodiments of the present invention. As shown in FIG. 6, a light source 601 in a sensor system 600 can emit a light beam, which may be collimated by a lens 603 before arriving at an optical diffusor/homogenizer, e.g. a holographic filter 602.

In accordance with various embodiments of the present invention, at each point on its transmission surface, the holographic filter 602 can convert the light beam into multiple light cones (or dots) toward the field of view (FOV). Each of these light cones can be generated with higher uniformity than in the ordinary light beam. Furthermore, the holographic filter 602 may be applied with different holographic prescriptions (such as size, optical density, wavelength range and material or substrates etc.) for configuring both the FOV and the distribution of the light cones or dots, in order for supporting various applications.

Figure 7:
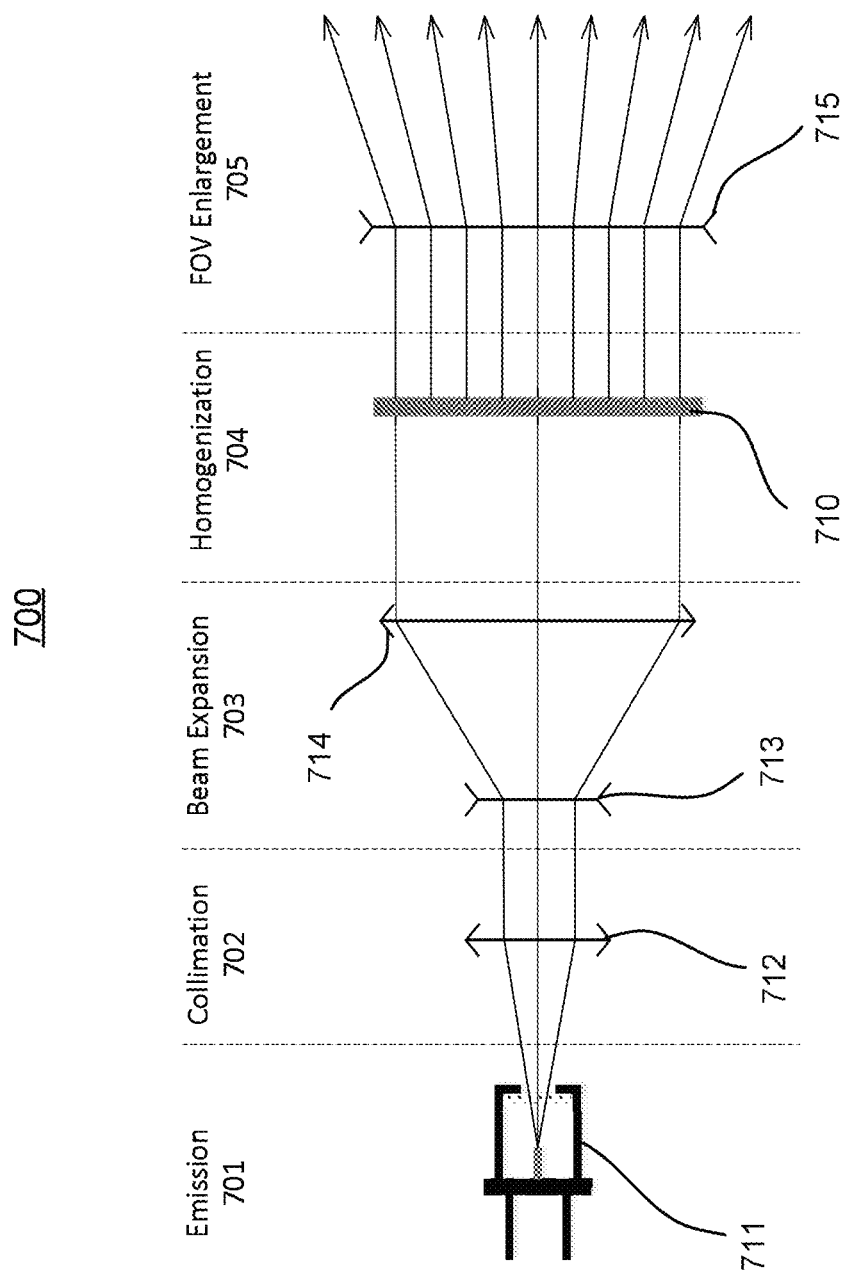
FIG. 7 shows an exemplary FOV illumination system, in accordance with various embodiments of the present invention.

FIG. 7 shows an exemplary FOV illumination system, in accordance with various embodiments of the present invention. As shown in FIG. 7, the FOV illumination system 700 can comprise multiple stages, such as an emission stage 701, a collimation stage 702, a beam expansion stage 703, a homogenization stage 704, and a FOV enlargement stage 705.

As shown in FIG. 7, a light source, such as a laser emitter 711, can generate a laser beam at the emission stage 701. For example, the laser emitter 201 can generate either a single laser pulse or a series of laser pulses. Then, the emitted laser beam can be collimated, e.g. via a lens 712, at the collimation stage 702.

In accordance with various embodiments, a collimator can be used for collimating the light generated by a point source. As known by skilled person in the art, collimated light refers to the light with parallel rays that may not spread substantially as the light propagates. For example, a lens can be used for collimating the light generated by the light source. Alternatively, mirrors, such as spherical mirrors and/or parabolic mirrors, can be used for collimating the light generated by a point source. For example, instead of using the lens, a mirror may be placed behind the light source to reflect the light rays toward the emitting direction in a substantially parallel manner.

Further as shown in FIG. 7, a beam expansion stage 703 can be used for expanding the laser beam in order to achieve a large FOV. In accordance with various embodiments, different beam expansion mechanisms can be employed. For example, a simple Galilean beam expander can include a concave lens 713 that is used for expanding the light beam and a convex lens 714 that is used to stop the beam expansion. On the other hand, a Keplerian beam expander, which involves two convex lens with a common focal point on the optical axis, may be used for achieving similar effects.

Also as shown in FIG. 7, a beam homogenizer 710 can be used to create a uniform laser beam profile at the beam homogenization stage 704. For example, the beam homogenizer 710 can transform a laser with Gaussian energy distribution into a homogenized laser with a flat-top intensity. In accordance with various embodiments, various types of homogenization mechanisms can be employed to homogenize the light beam. For example, the beam homogenizer 710 can be a murky glass, a diffractive beam homogenizer, or a micro lens array (MLA). Also, the beam homogenizer 710 can comprise a holographic filter.

Additionally, as shown in FIG. 7, a convex lens 715 can be used to further expand the FOV of the sensor system at the FOV enlargement stage 705. For example, by adjusting the configuration of the convex lens 715, the sensor system can achieve a larger FOV with a shorter detection range or a narrower FOV at a longer detection range.

In accordance with various embodiments, various stages can be rearranged, modified or bypassed. Also, additional stages can be applied and combined without limitation. As shown in FIG. 7, the beam expansion stage 703 may be configured following the collimation stage 702, but before the homogenization stage 704. Alternatively, the beam expansion stage 703 can be configured following the homogenization stage 704. Also, the FOV enlargement stage 705 may be modified or eliminated.

Figure 8:
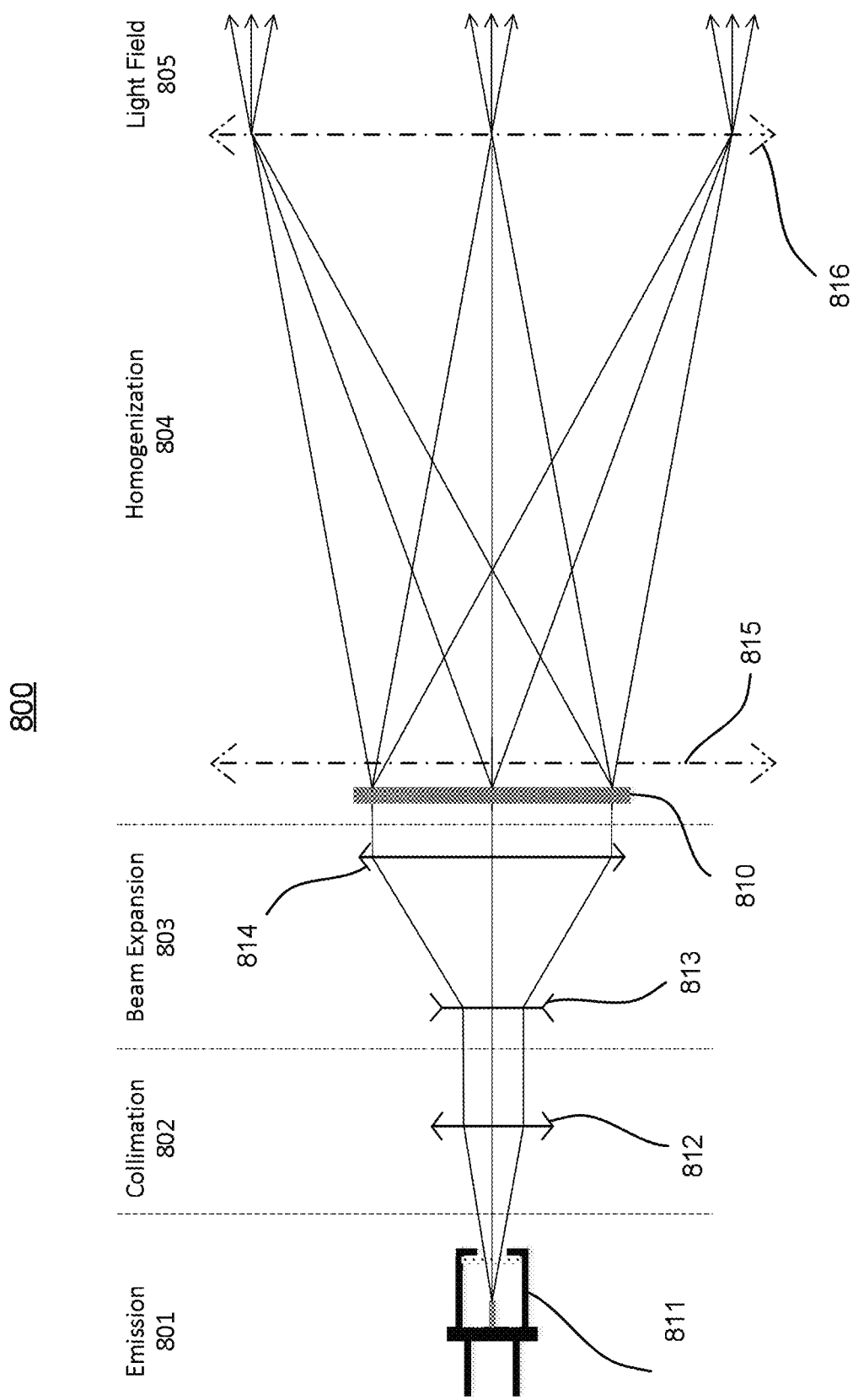
FIG. 8 shows an exemplary FOV illumination scheme with a holographic filter, in accordance with various embodiments of the present invention.

FIG. 8 shows an exemplary FOV illumination scheme with a holographic filter, in accordance with various embodiments of the present invention. As shown in FIG. 8, the FOV illumination system 800 can comprise multiple stages, such as an emission stage 801, a collimation stage 802, a beam expansion stage 803, and a homogenization stage 804. In accordance with various embodiments, various stages can be rearranged, modified or bypassed. Also, additional stages can be applied and combined without limitation.

As shown in FIG. 8, a light source, such as a laser emitter 811, can generate a laser beam at the emission stage 801. Then, the emitted laser beam can be collimated, e.g. via a lens 812, at the collimation stage 802. Furthermore, a beam expansion stage 803 can be configured for expanding the laser beam. For example, a concave lens 813 can be used to expand the light beam and a convex lens 814 can be used to stop the beam expansion and re-collimate the light beam.

In accordance with various embodiments, a holographic filter (or plate) 810 can be used to diffuse or homogenize the light beam, with or without the beam expansion 803. At each point of the transmission surface, the holographic filter 810 can convert the light beam into multiple light cones (or dots) in the field of view (FOV). Each of these light cone can be generated with higher uniformity than in the ordinary light beam.

As shown in FIG. 8, the lens 815 following the holographic filter 810 can direct each group of parallel rays transmitted from the holographic filter 810 to a particular point on the focal plane of the lens 815 (i.e., the illumination plane). Thus, the various cones (or dots) at different points on the transmission surface of the holographic filter 810 may effectively overlap onto each other at the illumination plane (since the illumination plane is a focal length away from the lens 815). Additionally, another lens 816, which may have the same focal length as the lens 815, can be positioned at the illumination plan. Thus, the lens 816 can correct the divergence of the telecentric cone angles exiting from the illumination plane and create a telecentric light field 805 (i.e. the chief rays are parallel to the optical axis), which is beneficial for various optical ranging or distance detection applications.

Referring back to FIG. 2, a portion of the light that is emitted from the light source 201 may be reflected back from one or more objects (not shown) in a field of view (FOV) 211 in the surrounding environment of the sensor system.

Figure 9:
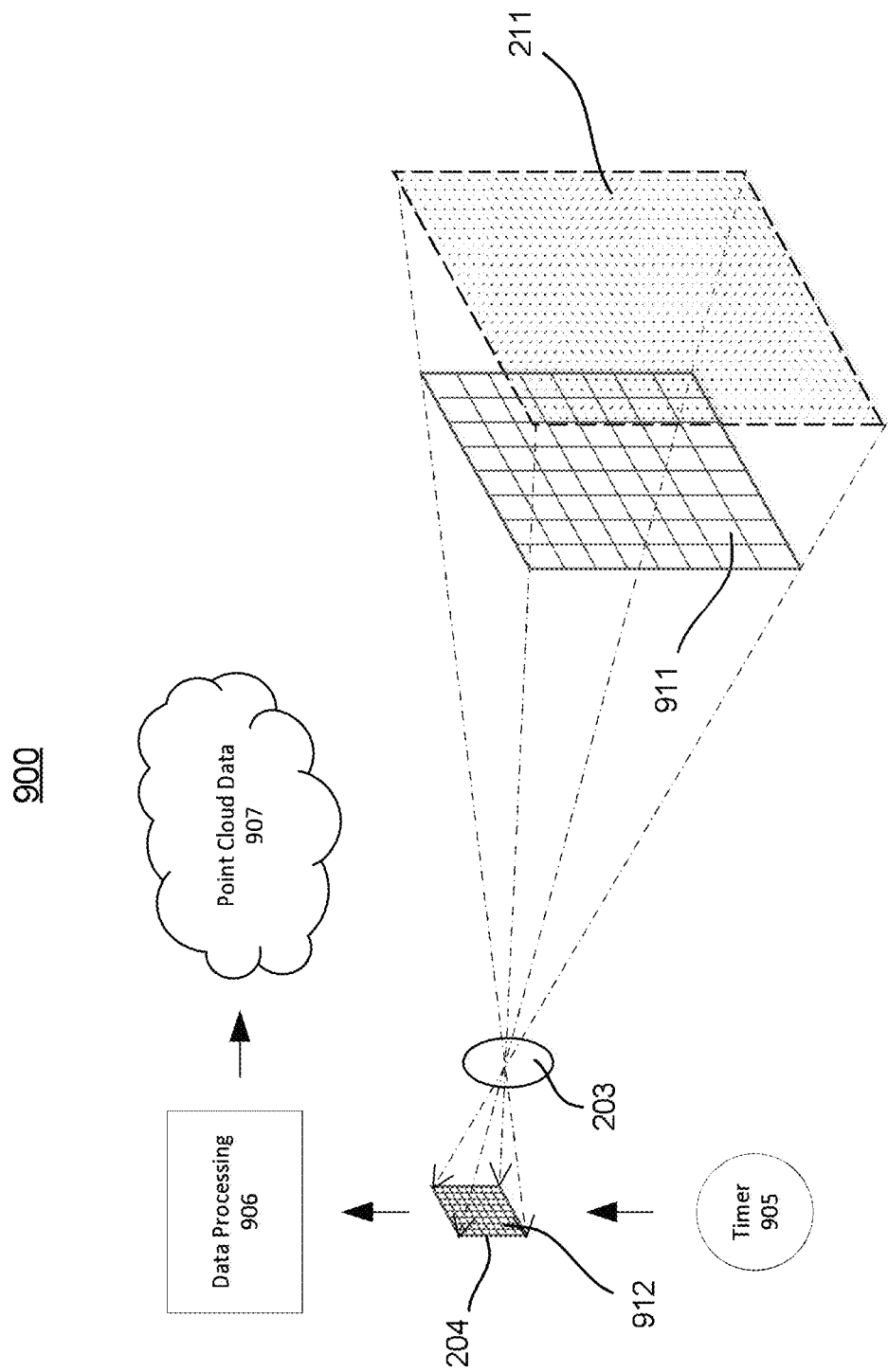
FIG. 9 shows an exemplary illustration of optical detection in a LIDAR sensor system, in accordance with various embodiments of the present invention.

FIG. 9 shows an exemplary illustration 900 of optical detection in a LIDAR sensor system, in accordance with various embodiments of the present invention. As shown in FIG. 9, the reflected light can be directed toward the detector 204 (e.g. a receiving device) in the sensor system. For example, depending on where the reflection happens and to which direction the light is reflected, one or more optical elements (e.g. a lens 203) can be used for capturing and directing the reflected light toward the detector 204.

In accordance with various embodiments of the present invention, the detector 204 can comprise a plurality of photo detection devices (or units), e.g. APD devices, to convert the received photo signals into electric signals. Also as shown in FIG. 9, the reflected light may fall into different sections of the FOV 211, and the reflected light in each section can be received by a corresponding photo detection device. Each photo detection device can generate one or more electrical signals that indicate distance information for one or more object points (or portions) in the corresponding sections of the FOV 211. Furthermore, the sensor system can detect the distance to various points (or portions) on the surface of one or more objects in the FOV 21. Thus, the sensor system can construct or provide information for constructing a data frame with a plurality of pixels, each of which contains distance information for one or more object points (or portions) in the corresponding sections of the FOV 211.

For example, the reflected light in a section 911 of the FOV 211 may be received by a corresponding photo detection device 912 in the detector 204. Then, the sensor system can detect the distance to a point (a portion) on the surface of an object, where the reflection happens, based on one or more electrical signals generated by the photo detection device 912.

In accordance with various embodiments of the present invention, each separate photo detection device (or unit) of the detector 912 may generate electric signal independently. Furthermore, the sensor system can obtain timing information related to the generated electric signals from the timer 905, which may also be used to trigger the emission of the light beam. Thus, the sensor system can achieve higher efficiency by scanning multiple points in the FOV of the sensor system simultaneously (or substantially simultaneously). In accordance with various embodiments of the present invention, a data processor 906 can convert the distance information into point cloud data 907. Thus, the sensor system can sense the distance and shape of various objects in the surrounding environment.

For example, the data processor 906 can obtain distance information for various reflection points based on the time difference between the time point when the electric signals are generated at different cells and the time point when the light is emitted (i.e. TOF information for each reflection point). Such distance information can be used for generating a data frame, which can be converted into point cloud data 907 that represents the surrounding environment of the sensor system.

Using the solid-state LIDAR system as described in the above, the sensor system can simultaneously, or substantially simultaneously, scan all the sections in the field of view 211. For comparison, the mechanical scanning type Lidar system is limited to the point-by-point scanning scheme, which takes a substantial longer time to complete the scan of the field of view. Thus, the scanning frequency for the solid-state LIDAR system can be substantially higher than the scanning frequency for the mechanical scanning type Lidar system. I.e., the time for the solid-state LIDAR system to perform a single scan of the surrounding environment can be substantially shorter than the time for the mechanical scanning type Lidar system to perform a single scan of the surrounding environment.

Additionally, the sensor system can take advantage of the high scanning efficiency by scanning the same area for multiple times in order to increase the signal-to-noise ratio. In the cases when the echo signal strength is low and/or the signal-to-noise ratio is low, the quality of the sensing result can be substantially improved by averaging multiple sampling results. For example, assuming the signal to noise ratio for a single sampling is 1, then signal to noise ratio for N times sampling is $SNR_{N\,sample}=N^{1/2}$, which indicates that N sampling can increase the signal to noise ratio to $N^{1/2}$ times of the original signal to noise ratio. Thus, using a solid-state LIDAR, the sensor system can take advantage of high sampling frequency, which allows the sensor system to use multiple sampling methods while ensuring minimum impact on the normal applications, to improve the signal to noise ratio in the scanning results.

Figure 10:
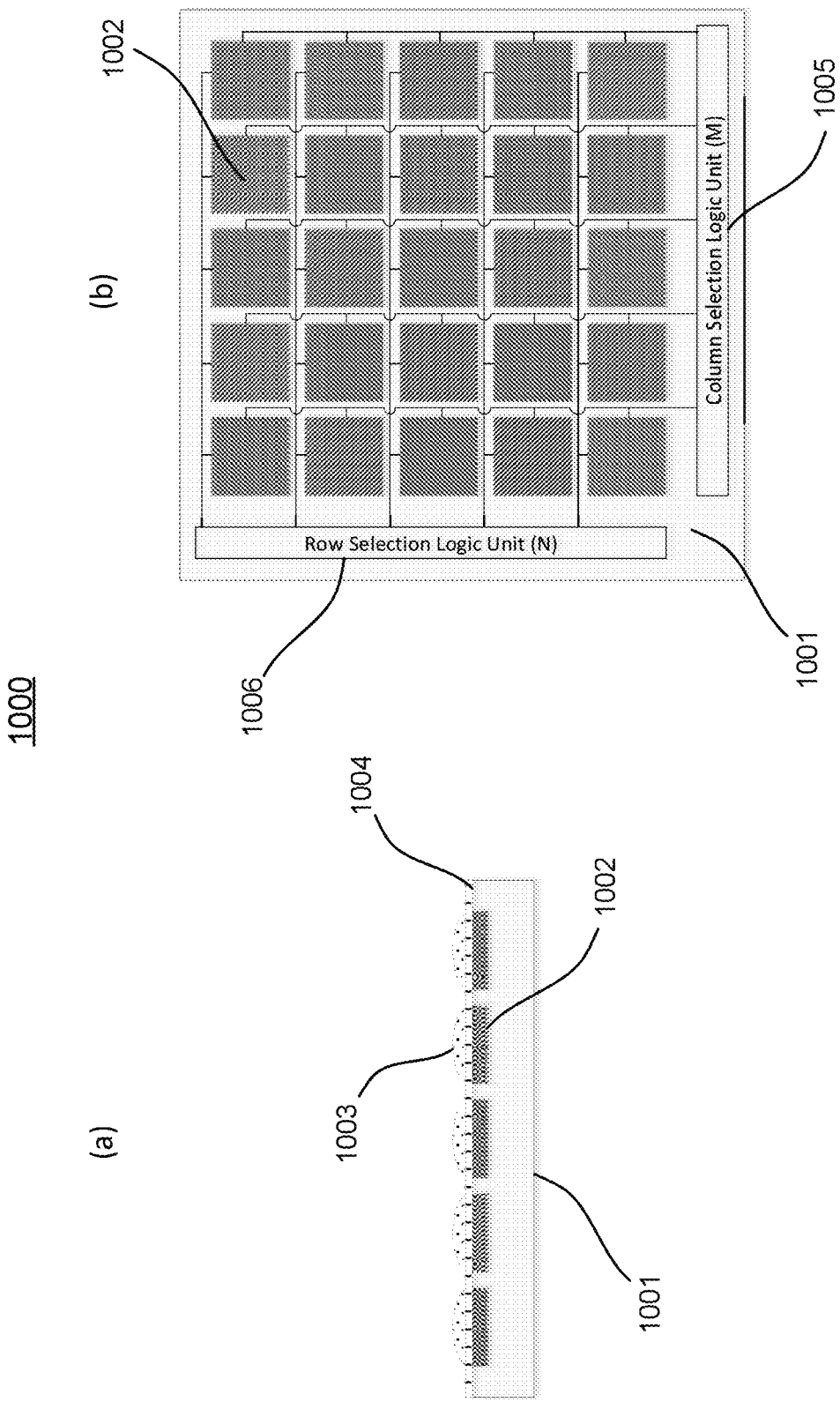
FIG. 10 shows an exemplary illustration of a detector with an array of photo detection devices, in accordance with various embodiments of the present invention.

FIG. 10 shows an exemplary illustration 1000 of a detector with an array of photo detection devices, in accordance with various embodiments of the present invention.

FIG. 10(*a*) is a cross section view of the detector 1001, which may comprise an array of photo detection devices 1002. Each photo detection device 1002 can comprise a detecting unit, e.g. an APD cell. Optionally, each photo detection device 1002 can also comprise a readout integrated circuit (ROIC) that corresponds to the APD cell. The ROIC unit can be used to read out photo detection events based on the generated electrical signals by the corresponding APD cell. In accordance with various embodiments, the APD cell and the ROIC can be integrated in the same chip. Alternatively ROIC can be implemented in separate chips, which may be bonded together using different packaging techniques.

In accordance with various embodiments of the present invention, a micro-lens 1003 can be arranged on top of each detection unit of the detector 1001, such that the light can be focused toward the APD cell with less reflection to the neighbor cells. Thus, the sensor system can reduce the interference, such as optical crosstalk, that may occur between different detection cells. Optionally, various types of optical filters and antireflective film 1004 can be arranged between the mirror and the APD cell. For example, the antireflective film can have a thickness of IA of the laser wavelength, in order to enhance the reception of the photo signals.

Furthermore, FIG. 10(*b*) is a planar view of the detector 1001, which may comprise an array of photo detection devices 1002. As shown in FIG. 10(*b*), the photo detection devices 1002 may be arranged in an array (e.g. a 2-D array or a matrix form). Also, the detector 1001 can include a column selection logic unit 1005 and/or a row selection logic unit 1006. For example, the column selection logic unit 1005 and/or the row selection logic unit 1006 may direct the detection events, originated from different cells in a column or a row, to logic units for evaluating TOF information respectively. Thus, multiple cells in a column or a row can share the same TOF logic unit for improving efficiency and reducing cost.

In accordance with various embodiments of the present invention, the alignment of the photo detection devices 1002 in the detector 1001 can be configured differently. For example, the photo detection units may be arranged in circles or rings, or any special geometries in order for better detecting the photo signals.

Figure 11:
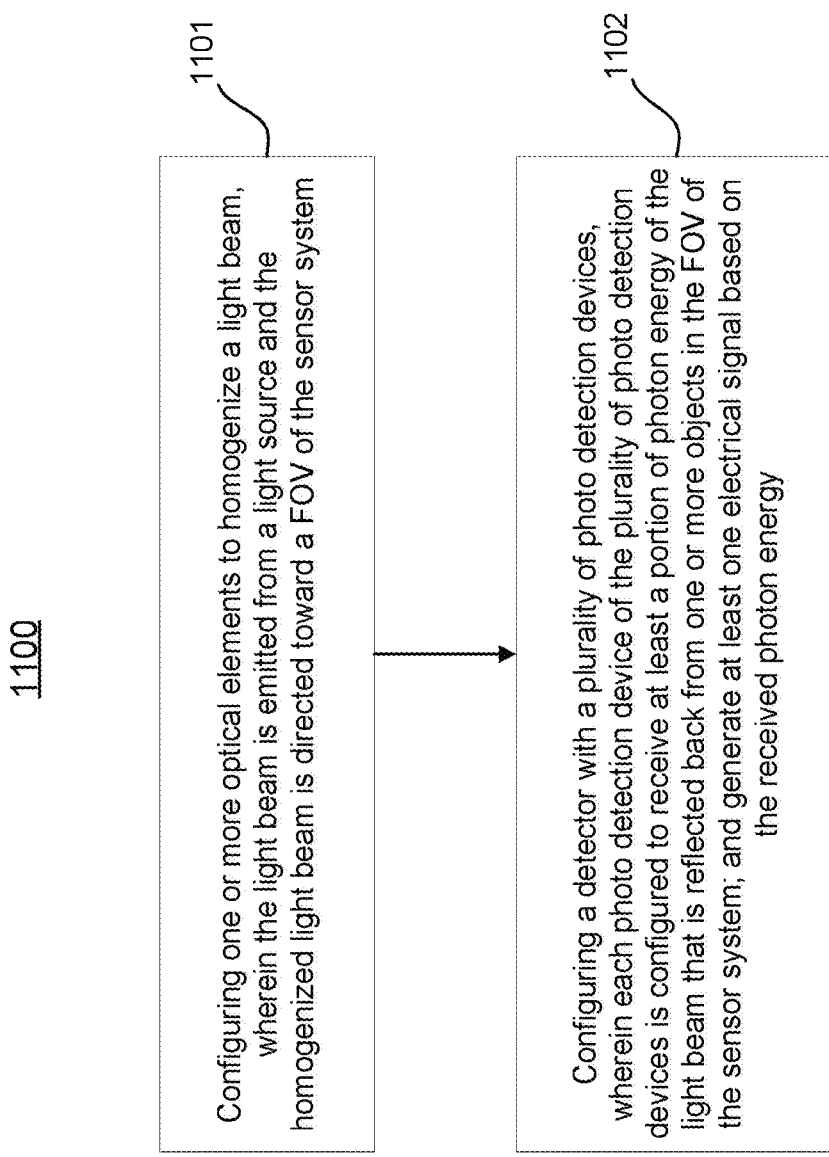
FIG. 11 shows a flowchart of sensing surrounding environment using a LIDAR sensor system, in accordance with various embodiments of the present invention.

FIG. 11 shows a flowchart of sensing surrounding environment using a LIDAR sensor system, in accordance with various embodiments of the present invention. As shown in FIG. 11, at step 1101, the LIDAR sensor system can use (or configure) one or more optical elements to homogenize a light beam, wherein the light beam is emitted from a light source and the homogenized light beam is directed toward the FOV of the sensor system. At step 1102, the LIDAR sensor system can use (or configure) a detector with a plurality of photo detection devices, wherein each photo detection device of the plurality of photo detection devices is configured to receive at least a portion of photon energy of the light beam that is reflected back from one or more objects in the FOV of the sensor system; and generate at least one electrical signal based on the received photon energy.

In accordance with various embodiments of the present invention, the sensor system can construct (or provide information for constructing) a data frame with a plurality of pixels, each of which contains distance information for a surface point (or portion) where the reflection happens (i.e. in a particular section of the FOV). Referring back to FIG. 9, a sensor system can comprise a detector 204 with a plurality of photo detection devices (or units), e.g. an APD array. Each of the detection devices can receive a portion of the photo energy that was reflected back from one or more objects in a particular section of the field of view (FOV). Also, each detection device can convert the photo energy received from a particular section of the FOV into one or more electrical signals. Thus, the detector 204 can detect distance information for the particular section of the FOV based on the electrical signal generated by a corresponding photo detection unit (e.g. by calculating TOF information for a particular section of the FOV).

As shown in FIG. 9, the photo detection device 912 can receive photo energy that is reflected from the section 911 of the FOV 211. Furthermore, the photo detection device 912 can generate one or more electrical signals accordingly. Then, the sensor system can obtain distance information for the section 911 of the FOV, which may be represented as a pixel in a data frame.

In accordance with various embodiments of the present invention, the detection resolution of a sensor system can be determined based on the FOV of the sensor system and the pixel numbers (i.e. the numbers of photo detection devices in the detector 204). In various embodiments, the FOV for a sensor system may be defined using an angle of view in the horizontal direction and an angle of view in the vertical direction. For example, the angle of view for a sensor system in the horizontal direction is α and the angle of view in the vertical direction is β. If the array of photo detection devices are in a two-dimensional (2D) matrix form (e.g., with a size of M×N, where M is the pixel number in the horizontal direction and N is the pixel number in the vertical direction of the data frame), then the angular resolution for the sensor system is α/M in the horizontal direction and β/N in the vertical direction.

In accordance with various embodiments of the present invention, the sensor system can improve the detection resolution by taking advantage of a pixel shifting scheme. For example, one or more pixel shifting operations can be performed to adjust the relative spatial relationship between the reflected light in the FOV 211 and the detector 204. Such adjustment to the relative spatial relationship between the received light in the FOV 211 and the detector 204 may affect the corresponding relationship between the sections of FOV 211 and the array of photo detection devices in the detector 204 (as illustrated in FIG. 9). For example, after one or more pixel shifting operations are performed, the photo detection device 912 may receive photo energy that is reflected from a section of FOV (not shown), which is shifted with one or more offsets from the original section 911 of the FOV.

In accordance with various embodiments of the present invention, different pixel shifting schemes can be used for scanning the surrounding environment with high resolution. By applying a pixel shifting scheme, the detector 204 (e.g. with an array of detection devices) can generate different sets of electrical signals. Each electrical signal may indicate the distance information for a particular point (or portion) in the FOV, and each set of electrical signals may correspond to a different set of points (or portions) in the FOV of the sensor system. Thus, the sensor system can obtain a resultant data frame with higher resolution.

Figure 12:
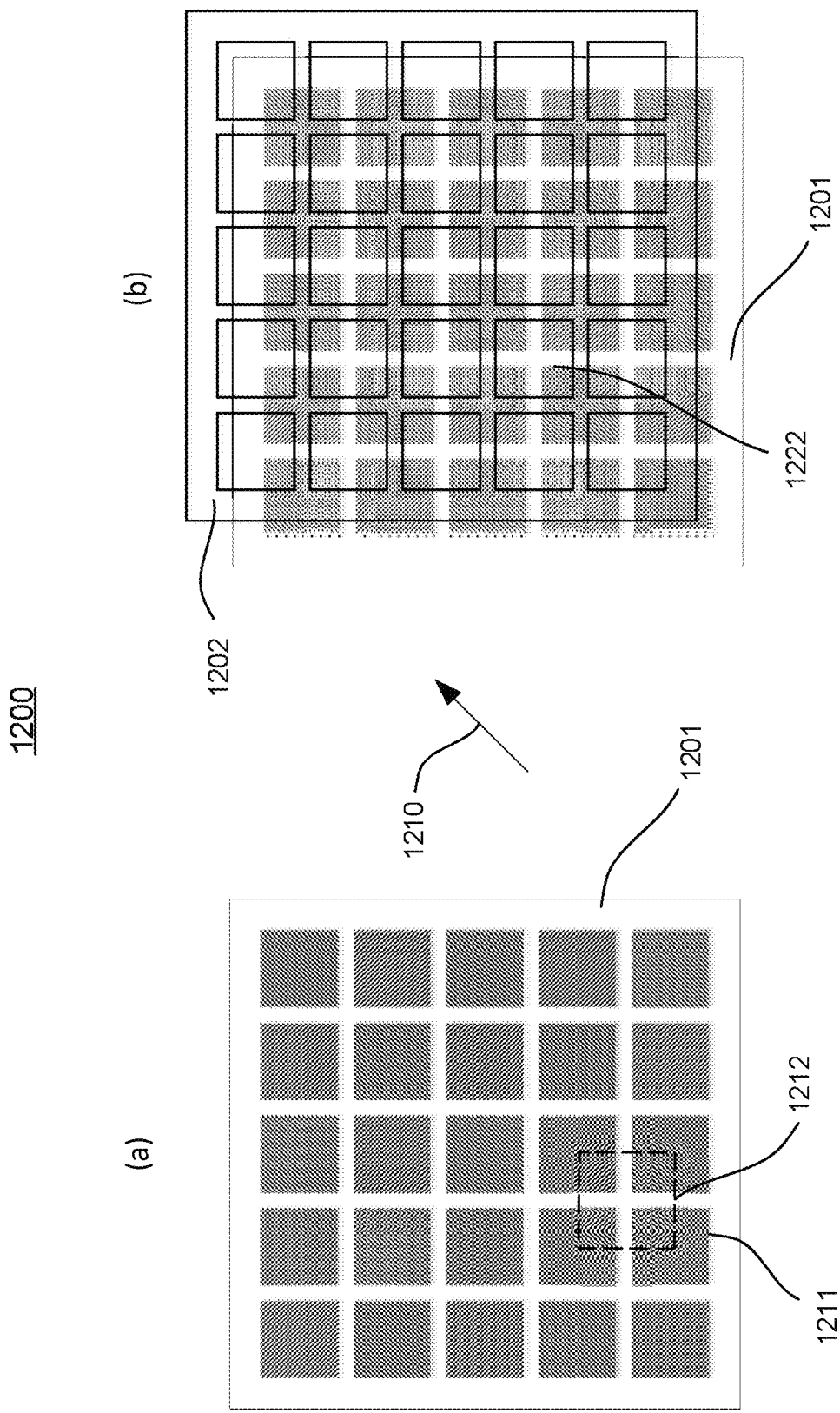
FIG. 12 shows an exemplary illustration of a pixel shifting scheme, in accordance with various embodiments of the present invention.

FIG. 12 shows an exemplary illustration of a pixel shifting scheme 1200, in accordance with various embodiments of the present invention. As shown in FIG. 12, when the pixel size 1211 is larger than the pixel distance (i.e., the difference between the pixel pitch size 1212 and the pixel size 1211), the sensor system can employ a pixel shifting scheme 1200 that involves generating two different data frames at two different time points.

As shown in FIG. 12(a), a detection device can detect distance information for a first set of pixels in a data frame 1201, when the sensor system is applied with a first configuration. Furthermore, the pixel shifting scheme 1200 can prescribe a pixel shifting operation 1210, which effectively cause the sensor system to be applied with a second configuration. The detection device can generate a different set of electrical signals that contain distance information for constructing a different data frame 1202 with a second set of pixels. As discussed in the above, each of the data frame 1201 and the data frame 1202 can be constructed accordingly to the corresponding relationship between the sections of FOV and the array of photo detection devices.

In accordance with various embodiments of the present invention, the pixel shifting operation 1210 may alter the sensor system between the first configuration and the second configuration. The first configuration and the second configuration can be correlated, predeterminedly, so that it can cause desirable pixel shifting effect between the first set of pixels in the data frame 1201 and the second set of pixels in the data frame 1202. For example, the pixel shifting effect can be translational or rotational depending on how the pixel shifting operation 1210 is prescribed and/or performed.

As shown in FIG. 12, the pixel shift (or offset) between the first set of pixels in the data frame 1201 and the second set of pixels in the data frame 1202 can be about a half pixel on each of the column direction and the row direction.

Alternatively, the pixel shift can be configured to be an arbitrary fraction of the pixel size. For example, the pixel shift can be configured to be a third of the pixel size or two third of the pixel size.

Furthermore, for the purpose of improving detection resolution, it is beneficial to avoid shifting the pixels in the data frame 1202 for an offset that is a multiplier of the pixel size (or pixel pitch size), which may cause the pixels in the data frame 1202 to effective overlap completely over pixels in the data frame 1201 (e.g., in which case, a pixel 1222 in the data frame 1202 may fall on a neighbor pixel in the data frame 1201), which does not provide additional information.

Figure 13:
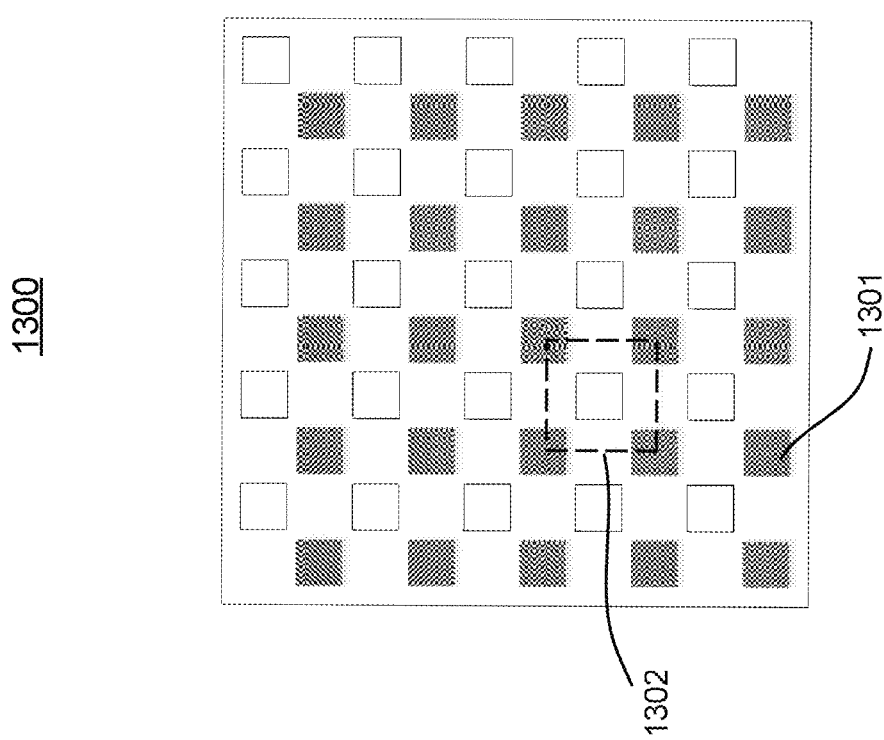
FIG. 13 shows an exemplary resultant data frame from applying a pixel shifting scheme, in accordance with various embodiments of the present invention.

FIG. 13 shows an exemplary resultant data frame from applying a pixel shifting scheme, in accordance with various embodiments of the present invention. By applying a pixel shifting scheme as shown in FIG. 12, a data processor can generate a resultant data frame 1300, which may have a higher detection resolution (e.g. 2X resolution), based on the first set of pixels in the data frame 1201 and the second set of pixels in the data frame 1202.

In accordance with various embodiments of the present invention, various data fusion techniques can be used for obtaining a resultant data frame based on the first set of pixels in the data frame 1201 and the second set of pixels in the data frame 1202. For example, each pixel of the resultant data frame can be calculated based on (e.g. by averaging) the distance information in the overlapped pixels in the data frame 1201 and the data frame 1202.

As shown in FIG. 12, the offset between the pixels in the data frame 1201 and the data frame 1202 is half a pixel on both the column and row directions. For example, a pixel in the data frame 1202 (e.g. the pixel 1222) may overlap up to four neighbor pixels in the data frame 1201. Thus, the value for the pixel 1222 and the values for the four neighbor pixels in the data frame 1201 can be used for calculating the value for a corresponding pixel 1302 in the resultant data frame 1300. Similarly, the value of a pixel 1301 in the resultant data frame 1300 can be calculated based on the value for the pixel 1211 and the values for the neighbor pixels in the data frame 1202. Thus, the resultant data frame 1300 can have a resolution that doubles the resolution of each data frame 1201 or 1202.

In accordance with various embodiments of the present invention, multiple data frames or multiple set of pixels may be used for obtaining the resultant data frame 1300. For example, the sensor system can generate three sets of electric signals, which may correspond to three set of pixels in three data frames (e.g. one data frame with an offset of one third of the pixel size and another data frame with an offset of two third of the pixel size). Thus, the resultant data frame can have a resolution that triples the resolution of each data frame (e.g., by using various data fusion techniques).

In accordance with various embodiments of the present invention, the sensor system can achieve pixel shifting effect by applying different configurations on the sensor system, such as by altering the spatial location of at least one of the light source, the intermediate optical elements or the detector along the optical path. Furthermore, different mechanisms can be used for performing the pixel shifting operation in a LIDAR sensor system.

Referring back to FIG. 2, the sensor system 210 can perform a pixel shifting operation to alter the optical path for the emitted light beam to travel from the light source 201 to the detector 204. By performing the pixel shifting operation, the sensor system 210 can apply different configurations on the sensor system 210, in order to apply the pixel shifting scheme. Furthermore, the sensor system 210 can employ an oscillation mechanism to keep altering the optical path for the emitted light beam to travel from the light source 201 to the detector 204 at a predetermined frequency. As shown in FIG. 2, any of the optical components in the sensor system, such as the light source 201 or the detector 204, may be configured at a first relative spatial location or orientation in the first configuration and at a second relative spatial location or orientation in the second configuration, and wherein the first relative spatial location or orientation and the second relative spatial location or orientation are different. I.e., the sensor system 210 can cause the light source 201 or the detector 204 to move, either translationally or rotationally, relatively to the receiving light. Alternatively, the sensor system 210 can cause one or more intermediate optical elements in the sensor system 210 to move, either translationally or rotationally, to cause the light to travel along a different path relative to the detector 204.

In accordance with various embodiments of the present invention, the sensor system 210 can perform a pixel shifting operation by taking advantage of multiple light sources that are aligned adjacent to each other. For example, when the emission of light from each light source is prescribed in an alternative fashion, the optical path for the emitted light beam to travel from a light source to the detector can be altered accordingly. Thus, the sensor system 210 can achieve pixel shifting effect by applying different configurations on the sensor system. Moreover, the performance of the sensor system 210 can be more stable and consistent, since no moving components are required in the sensor system 210.

Figure 14:
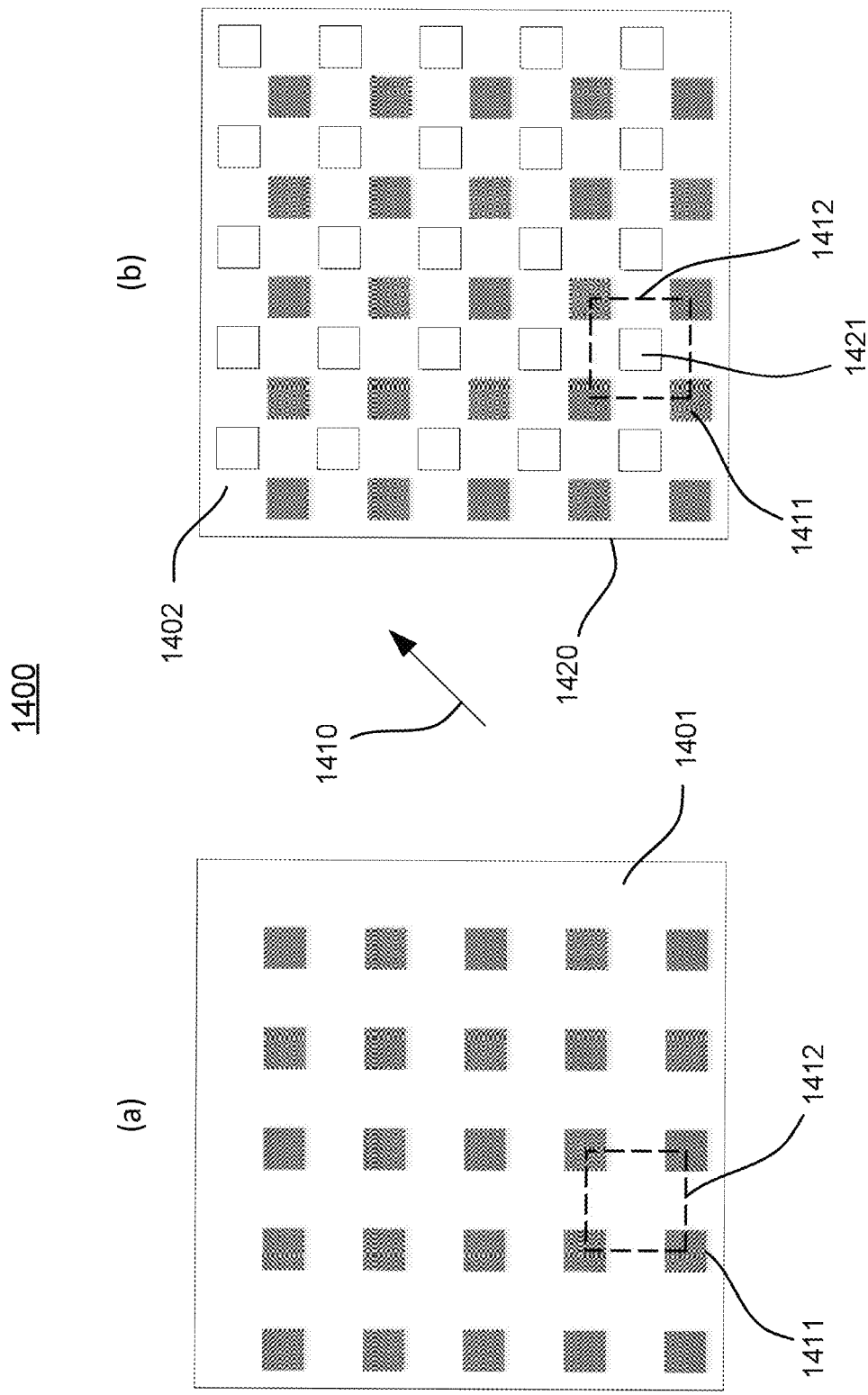
FIG. 14 shows an exemplary illustration of an alternative pixel shifting scheme, in accordance with various embodiments of the present invention.

FIG. 14 shows an exemplary illustration of an alternative pixel shifting scheme 1400, in accordance with various embodiments of the present invention. As shown in FIG. 14, the pixel size 1411 is smaller than the pixel distance (i.e., the difference between the pixel pitch size 1412 and pixel size 1411).

When the sensor system is applied with a first configuration, a detector (or one or more detection devices) can generate a first set of electrical signals for constructing a first set of pixels 1401 as shown in FIG. 14(a). Then, the sensor system can perform a pixel shifting operation 1410, which effectively cause the sensor system to be applied with a second configuration. Thus, the detection device can generate a different set of electrical signals that contains information for constructing a different set of pixels 1402 as shown in FIG. 14(b).

In accordance with various embodiments of the present invention, the pixel shifting operation 1410, which alter the sensor system between the first configuration and the second configuration with predetermined correlation, can cause the pixel shift (or offset) between the first set of pixels 1401 and the second set of pixels 1402. For example, the pixel shift between the first set of pixels 1401 and the second set of pixels 1402 can be about a half pixel or a third of a pixel on either (or each of) the row and/or column directions.

Furthermore, the data processor can generate a resultant data frame 1420 based on the first set of pixels 1401 and the second set of pixels 1402. For example, the pixel shift can be configured to be an arbitrary fraction of the pixel size (or the pixel pitch size). For the purpose of improving detection resolution, it is beneficial to avoid shifting the pixels in the resultant data frame 1420 to overlap completely over a neighbor pixel.

As shown in FIG. 14, the offset between the first set of pixels 1401 (e.g. the pixel 1411) and the second set of pixels 1402 (e.g. the pixel 14121) is half a pixel distance 1412 on both the column and row direction. As a result, the first set of pixels 1401 do not overlap with the second set of pixels 1402. In accordance with various embodiments of the present invention, various data fusion techniques can be used for obtaining a resultant data frame with a higher detection resolution based on the data frame 1401 and the data frame 1402. For example, a simple approach is to combine (e.g. merge) the first set of pixels 1401 and the second set of pixels 1402 directly into the resultant data frame 1420, without constructing two separate data frames first. Thus, the resultant data frame 1420 can have a resolution that doubles the original resolution of each set of pixels 1201 or 1202.

In accordance with various embodiments of the present invention, multiple set of pixels may be used for obtaining the resultant data frame 1420. For example, the sensor system can generate three sets of electric signals, which may correspond to three set of pixels in three data frames (e.g. one data frame with an offset of one third of the pixel size and another data frame with an offset of two third of the pixel size). Thus, the resultant data frame can have a resolution that triples the resolution of each data frame, e.g. by using various data fusion techniques.

Thus, using the pixel shifting scheme 1400, a sensor system can construct or obtain information for constructing a resultant data frame 1420 directly, without a need for generating multiple different data frames separately at different time points.

In accordance with various embodiments of the present invention, the sensor system can augment one or more special optical elements, such as a planar plate lens, along the optical path for achieving the pixel shifting effect.

Figure 15:
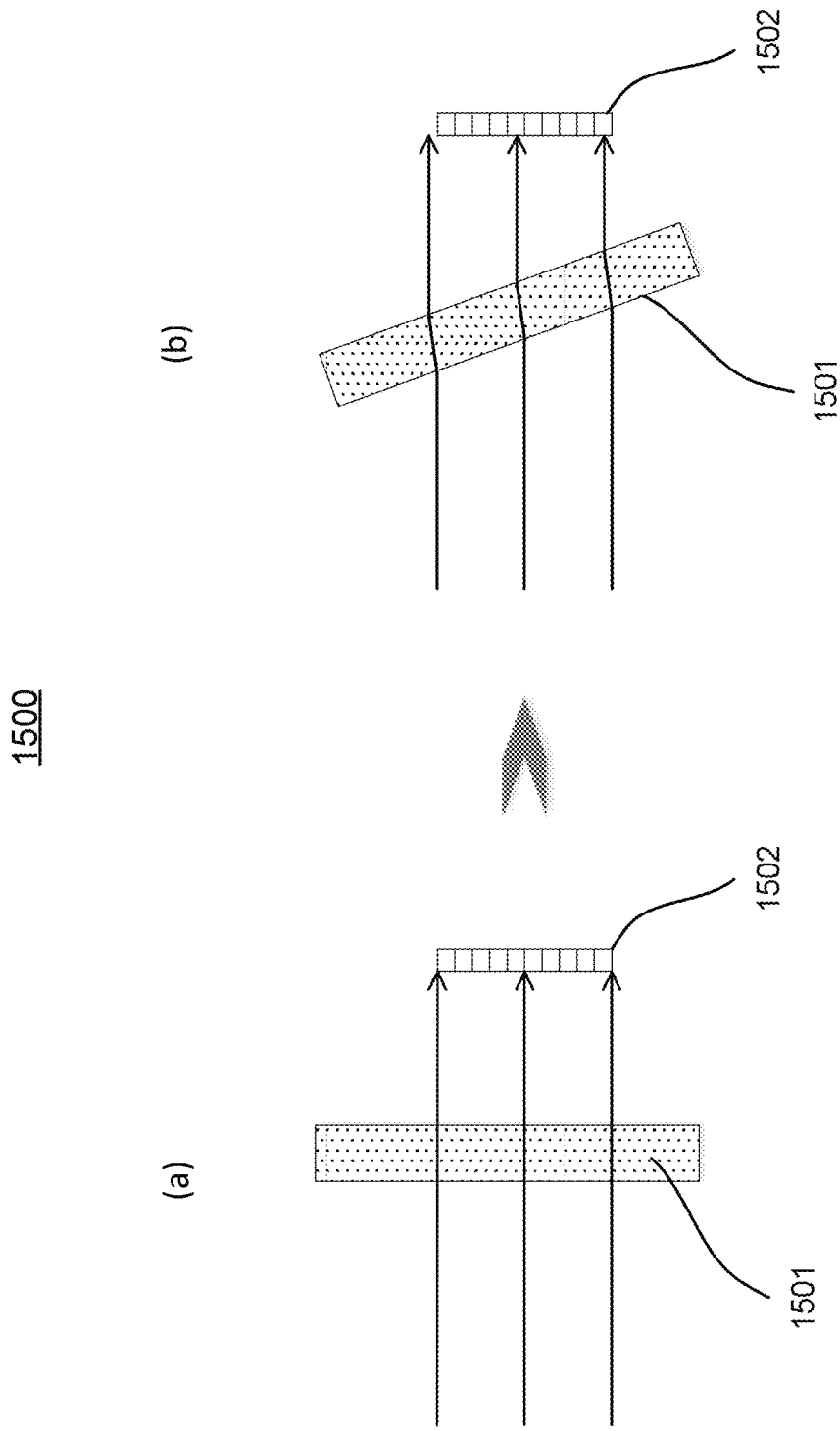
FIG. 15 shows an exemplary illustration of using a planar plate lens in a pixel shifting scheme, in accordance with various embodiments of the present invention.

FIG. 15 shows an exemplary illustration of using a planar plate lens in a pixel shifting scheme 1500, in accordance with various embodiments of the present invention. As shown in FIG. 15(a), a planar plate lens 1501 can be positioned in front of the detection device 1502. As shown in FIG. 15(b), the sensor system can rotate the planar plate lens 1501 for a predetermined angle that may shift the light at the receiving end. Since both surfaces of the planar plate lens 1501 are parallel to each other, after the planar plate lens is rotated for an angle, the outgoing beam may be parallel to the incident beam, but with an offset.

In accordance with various embodiments of the present invention, the sensor system can generate a resultant data frame (not shown) based on the different sets of electrical signals. The resultant data frame may comprise multiple sets of pixels that correspond to the different configurations of the sensor system.

As shown in FIG. 15, the planar plate lens 1501 may be configured at a first angle relative to the incoming light in the first configuration and the planar plate lens 1501 may be configured at a second angle relative to the incoming light in the second configuration. The first angle and the second angle can be configured in order to cause the desired pixel shifting effect. For example, the planar plate lens 1501 can be arranged perpendicular to the income light in the first configuration. Then, the plate can be rotated about an axis, which is perpendicular to the incoming light, to cause the light to travel at a different path, which is parallel to the incoming light but with an offset, in the second configuration. Alternatively, the planar plate lens 1501 can be arranged at a non-perpendicular angle relative to the income light in the first configuration. Then, after the pixel shifting operation is performed, the plate can be rotated about an axis, which is perpendicular to the light, to cause the light to travel at a different path with a different offset from the incident light in the second configuration. Furthermore, the system can rotate the plate in different directions (i.e. about different axis's), simultaneously or sequentially, to achieve the technical effect of pixel shifting in multiple directions or dimensions (of the resultant data frame).

In another example, the planar plate lens 1501 may be configured at a first angle relative to the incoming light in the first configuration, at a second angle relative to the incoming light in the second configuration, and at a third angle relative to the incoming light in the third configuration. Thus, the sensor system can obtain a resultant data frame, which may triple the original resolution, based on three sets of electrical signals generated for the three configurations.

Furthermore, an oscillation mechanism, such as a mechanical oscillator that couples to the planar plate lens 1501, can be used to repeatedly rotate or swap the angle of the planar plate lens 1501, in order to keep altering the optical path for the emitted light beam to travel from the light source 201 to the detector 204 at a predetermined frequency. For example, by employing such an approach, the sensor system can take advantage of both the pixel shifting scheme and the multiple sampling method as described in the above.

In accordance with various embodiments of the present invention, it is beneficial to use an additional optical element, such as a planar plate lens 1501. For example, one benefit for using an additional optical element is that it is easy to implement, and it can ensure the overall stability of the sensor system (since the sensor system can avoid altering the configuration of various optical components in the sensor system, such as the light source, optical elements or the detector along the optical path, which can be difficult and error-prone). Another benefit for using an additional optical element is that it is flexible. For example, the sensor system can adjust or reconfigure the pixel shifting scheme by prescribe and perform a different pixel shifting operation, e.g. by configuring and rotating the planar plate lens 1501 at different angles as shown in FIG. 15.

Figure 16:
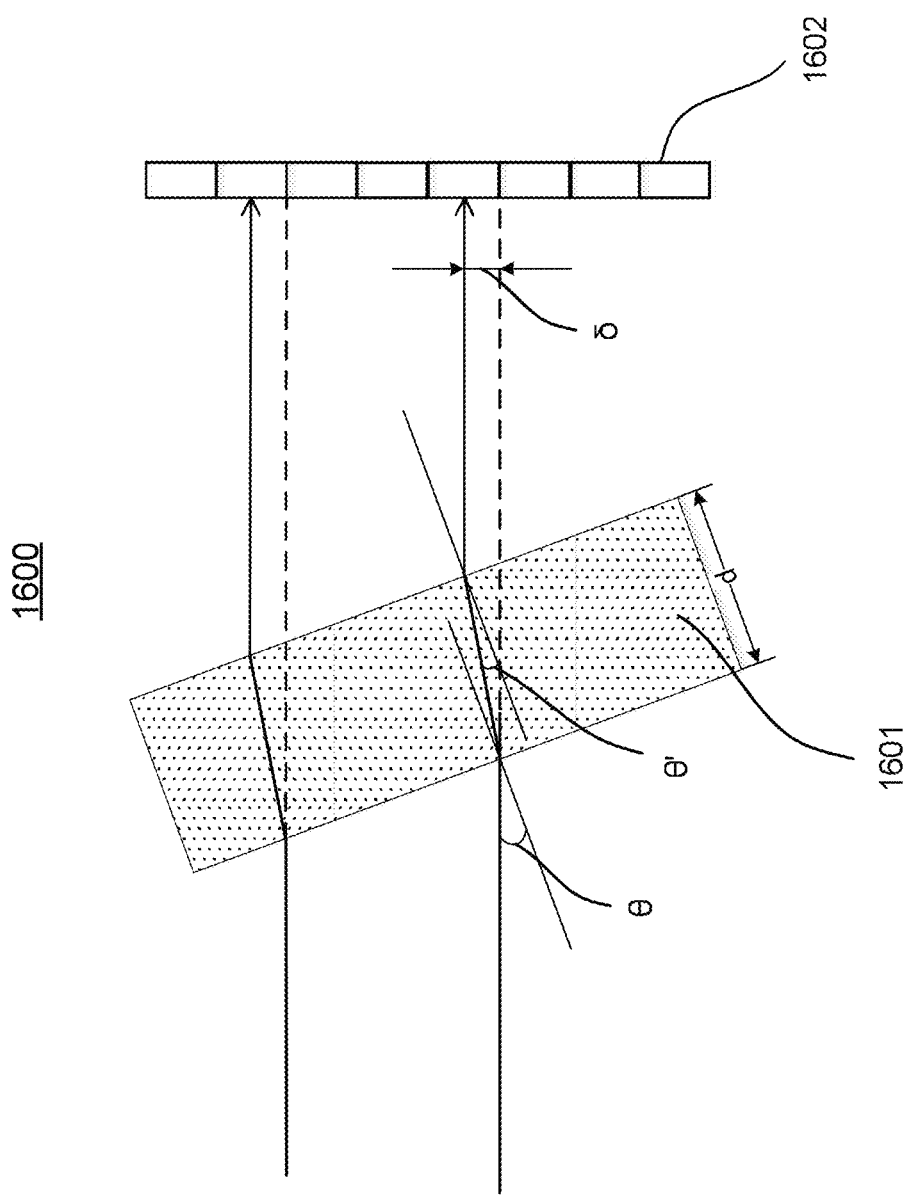
FIG. 16 shows an exemplary illustration of pixel shifting effect caused by rotating a planar plate lens, in accordance with various embodiments of the present invention.

FIG. 16 shows an exemplary illustration of pixel shifting effect caused by rotating a planar plate lens, in accordance with various embodiments of the present invention. As shown in FIG. 16, a planar plate lens 1601 can be arranged in front of the detection device 1602. Since both surfaces of the planar plate lens 1601 are parallel to each other, the outgoing beam is parallel to the incident beam (e.g. with an offset δ), after the planar plate lens 1601 is rotated for a predetermined angle.

In the example as shown in FIG. 16, the planar plate lens 1601 is rotated for an angle θ. Then, the offset δ can be defined as $$\delta = (d\tan\theta - d\tan\theta')\cos\theta, \text{ where } \theta' = \arcsin\left(\frac{\sin\theta}{n}\right),$$

n is the refractive index and d is the thickness of the plate 1401.

Thus, the offset δ can be computed using the following formula:

$$\delta = \left(d\tan\theta - d\tan\left(\arcsin\left(\frac{\sin\theta}{n}\right)\right)\right)\cos\theta.$$

Furthermore, assuming θ is a small angle, then the offset δ can be estimated using the following approximation, $$\delta \approx d\theta\left(1 - \frac{1}{n}\right).$$

In another example, when the plate 1401 rotates from $\theta_1$ to $\theta_2$, the offset can be calculated using the following formula, $$\Delta\delta = \left(d\tan\theta_1 - d\tan\left(\arcsin\left(\frac{\sin\theta_1}{n}\right)\right)\right)\cos\theta_1 - \left(d\tan\theta_2 - d\tan\left(\arcsin\left(\frac{\sin\theta_2}{n}\right)\right)\right)\cos\theta_2.$$

In the above formula, assuming that the rotated angle, $\Delta\theta = \theta_1 - \theta_2$, is small, then the offset can be approximated as:

$$\Delta\delta = d\Delta\theta\left(1 - \frac{1}{n}\right).$$

Thus, the sensor system can rotate the plate 1601 for a predetermined angle for achieving a desired amount of pixel shifting. For example, if the pixel shift is desired to be a half of a pixel on each direction $$\left(\text{i.e., } \Delta\delta_x = \frac{I_x}{2} \text{ and } \Delta\delta_y = \frac{I_y}{2}\right),$$

then the rotation angles $\Delta\theta_x$ and $\Delta\theta_y$ can be determined as following, $$\Delta\theta_x = \frac{\frac{I_x}{2}}{d\left(1 - \frac{1}{n}\right)}$$

$$\Delta\theta_y = \frac{\frac{I_y}{2}}{d\left(1 - \frac{1}{n}\right)}$$

where $I_x$ and $I_x$ is the pixel dimension of each detection unit on x and y dimension respectively. Also, the angle to rotate the plate 1601 for achieving other desired amount of pixel shifting can be determined in a similar fashion.

Figure 17:
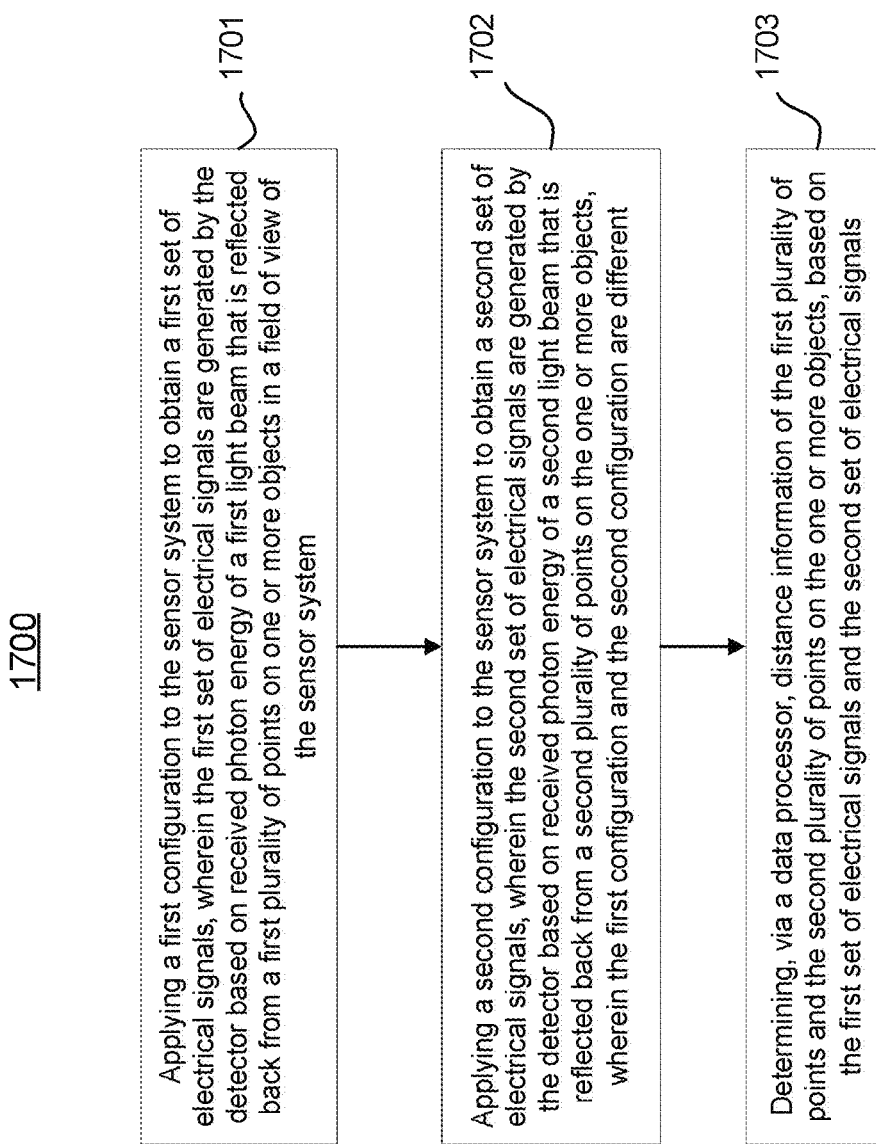
FIG. 17 shows a flowchart of supporting pixel shifting in a LIDAR sensor system, in accordance with various embodiments of the present invention.

FIG. 17 shows a flowchart of supporting pixel shifting in a LIDAR sensor system, in accordance with various embodiments of the present invention. As shown in FIG. 17, at step 1701, the LIDAR sensor system can apply a first configuration to the sensor system to obtain a first set of electrical signals, wherein the first set of electrical signals are generated by the detector based on received photon energy of a first light beam that is reflected back from one or more objects in a field of view of the sensor system. At step 1702, the LIDAR sensor system can apply a second configuration to the sensor system to obtain a second set of electrical signals, wherein the second set of electrical signals are generated by the detector based on received photon energy of a second light beam that is reflected back from the one or more objects, wherein the first configuration and the second configuration are different. At step 1703, the LIDAR sensor system can use a data processor to determine distance information of the one or more objects based on the first set of electrical signals and the second set of electrical signals.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for sensing one or more objects using a detector with a plurality of subdetectors, comprising:
   generating, via the detector, a first set of electrical signals based on photon energy of a first light beam received by the plurality of subdetectors in a first configuration, wherein the first light beam is reflected back from a first plurality of points on one or more objects:
   generating, via the detector, a second set of electrical signals based on photon energy of a second light beam received by the plurality of subdetectors in a second configuration, wherein the second light beam is reflected back from a second plurality of points on the one or more objects, wherein the first configuration and the second configuration are different; and
   determining, via a data processor, distance information of the first plurality of points and the second plurality of points on the one or more objects based on the first set of electrical signals and the second set of electrical signals,
   wherein a planar plate lens is arranged in front of the detector, and the planar plate lens is configured to be at a first angle relative to incoming light in the first configuration and is configured to be at a second angle relative to incoming light in the second configuration.

2. The method of claim 1, wherein the detector is configured at a first spatial location relative to received light in the first configuration, and the detector is configured at a second spatial location relative to received light in the second configuration, and wherein the first spatial location and the second spatial location are different.

3. The method of claim 1, wherein the first set of electrical signals corresponds to a first set of pixels, and the second set of electrical signals corresponds to a second set of pixels.

4. The method of claim 3, further comprising: switching the plurality of subdetectors between the first configuration and the second configuration to cause a pixel shift between the first set of pixels and the second set of pixels.

5. The method of claim 4, wherein the pixel shift between the first set of pixels and the second set of pixels is about a fraction of a pixel size in at least one of a column direction or a row direction of the plurality of subdetectors.

6. The method of claim 3, further comprising: generating, via the data processor, a resultant data frame with a higher resolution based on the first set of pixels and the second set of pixels.

7. The method of claim 3, further comprising generating, via the data processor, a resultant data frame based on a first data frame associated with the first set of pixels and a second data frame associated with the second set of pixels.

8. The method of claim 7, wherein the resultant data frame is generated using a data fusion technique.

9. The method of claim 7, further comprising:
   generating, via the data processor, the resultant data frame by averaging the distance information corresponding to overlapped pixels in the first data frame and the second data frame, when a pixel size of the first data frame is greater than a pixel pitch size of the first data frame; or
   generating, via the data processor, the resultant data frame by merging the first data frame and the second data frame, when the pixel size of the first data frame is no greater than the pixel pitch size of the first data frame.

10. The method of claim 1, wherein the first light beam and the second light beam are generated by one or more light sources.

11. The method of claim 10, wherein the first light beam and the second light beam have wavelengths of about 905 nm or about 1550 nm.

12. The method of claim 10, wherein the first light beam and the second light beam have different optical paths.

13. The method of claim 1, wherein one of the first angle or the second angle is substantially a vertical angle.

14. The method of claim 1, wherein the distance information of the first plurality of points and the second plurality of points on the one or more objects is measured based on time-of-flight (TOF) information or a time-frequency relationship.

15. A sensor system, comprising:
   a detector with a plurality of subdetectors; and
   a data processor,
   wherein the detector is configured to
      generate a first set of electrical signals based on photon energy of a first light beam received by the plurality of subdetectors in a first configuration, wherein the first light beam is reflected back from a first plurality of points on one or more objects; and
      generate a second set of electrical signals based on photon energy of a second light beam received by the plurality of subdetectors in a second configuration, wherein the second light beam is reflected back from a second plurality of points on the one or more objects, wherein the first configuration and the second configuration have a predetermined correlation, and
   wherein the data processor is configured to:
      determine distance information for each of the first plurality of points and the second plurality of points on the one or more objects based on the first set of electrical signals and the second set of electrical signals, and
      wherein the sensor system further comprises a planar plate lens arranged in front of the detector, and the planar plate lens is configured to be at a first angle relative to incoming light in the first configuration and is configured to be at a second angle relative to incoming light in the second configuration.

16. The sensor system of claim 15, wherein one of the first angle and the second angle is substantially a vertical angle.

17. A non-transitory computer-readable medium with instructions stored thereon, that when executed by a processor, cause the processor to perform steps comprising:
   generating, via a detector with a plurality of subdetectors, a first set of electrical signals based on photon energy of a first light beam received by the plurality of subdetectors in a first configuration, wherein the first light beam is reflected back from a first plurality of points on one or more objects;

generating, via the detector, a second set of electrical signals based on photon energy of a second light beam received by the plurality of subdetectors in a second configuration, wherein the second light beam is reflected back from a second plurality of points on the one or more objects, wherein the first configuration and the second configuration are different;

determining, via a data processor, distance information of the first plurality of points and the second plurality of points on the one or more objects based on the first set of electrical signals and the second set of electrical signals, and causing a planar plate lens in front of the detector to be at a first angle relative to incoming light in the first configuration and to be at a second angle relative to incoming light in the second configuration.

* * * * *